US012588662B2

(12) United States Patent
     Borowski

(10) Patent No.:    US 12,588,662 B2
(45) Date of Patent:      Mar. 31, 2026

(54) BUOYANT MODULAR BEEHIVE APPARATUS

(71) Applicant: Konrad Michal Borowski, Kitchener (CA)

(72) Inventor: Konrad Michal Borowski, Kitchener (CA)

( * ) Notice: Subject to any disclaimer, the term of this patent is extended or adjusted under 35 U.S.C. 154(b) by 0 days.

(21) Appl. No.: 18/748,733

(22) Filed: Jun. 20, 2024

(65) Prior Publication Data

US 2024/0334913 A1      Oct. 10, 2024

Related U.S. Application Data

(60) Provisional application No. 63/652,881, filed on May 29, 2024.

(51) Int. Cl.
     A01K 47/02        (2006.01)
     A01K 47/06        (2006.01)
(52) U.S. Cl.
     CPC .............. A01K 47/02 (2013.01); A01K 47/06 (2013.01)
(58) Field of Classification Search
     CPC ......... A01K 47/00; A01K 47/02; A01K 47/06
     See application file for complete search history.

(56) References Cited

U.S. PATENT DOCUMENTS

| | | | | |
|---|---|---|---|---|
| 3,350,728 | A  * | 11/1967 | Root ...................... | A01K 47/06 |
| | | | | 449/19 |
| 4,546,509 | A  * | 10/1985 | Huetter .................. | A01K 47/00 |
| | | | | 449/7 |
| 11,122,780 | B2 | 9/2021 | Bryant | |
| 11,166,440 | B2 * | 11/2021 | Skvorecz ............... | A01K 53/00 |
| 2016/0192625 | A1* | 7/2016 | Santos ................... | A01K 47/00 |
| | | | | 449/29 |
| 2019/0110446 | A1* | 4/2019 | Bryant ................... | A01K 47/06 |
| 2020/0323177 | A1* | 10/2020 | Drennan .............. | A01K 1/0047 |

FOREIGN PATENT DOCUMENTS

| | | |
|---|---|---|
| CN | 111642421 A | 9/2020 |
| EP | 4085762 A1 | 11/2022 |
| KR | 100757999 B1 | 9/2007 |
| KR | 20210001004 U | 5/2021 |

* cited by examiner

*Primary Examiner* — Joshua J Michener
*Assistant Examiner* — Nicole Paige Maccrate
(74) *Attorney, Agent, or Firm* — Own Innovation; James W. Hinton; Caitlin O'Flynn

(57)      ABSTRACT

Provided is a beehive apparatus. The beehive apparatus includes a securing mechanism for anchoring the beehive apparatus to a ground surface, a buoyancy component situated above the securing mechanism and for floating and rising with a water level, and a plurality of honey harvesting components positioned atop the buoyancy component. The storage components house bees and store honey above the water level.

14 Claims, 22 Drawing Sheets

700a/b

810

214

216

220

1810

144

1980

1970

1960

142

1920

222
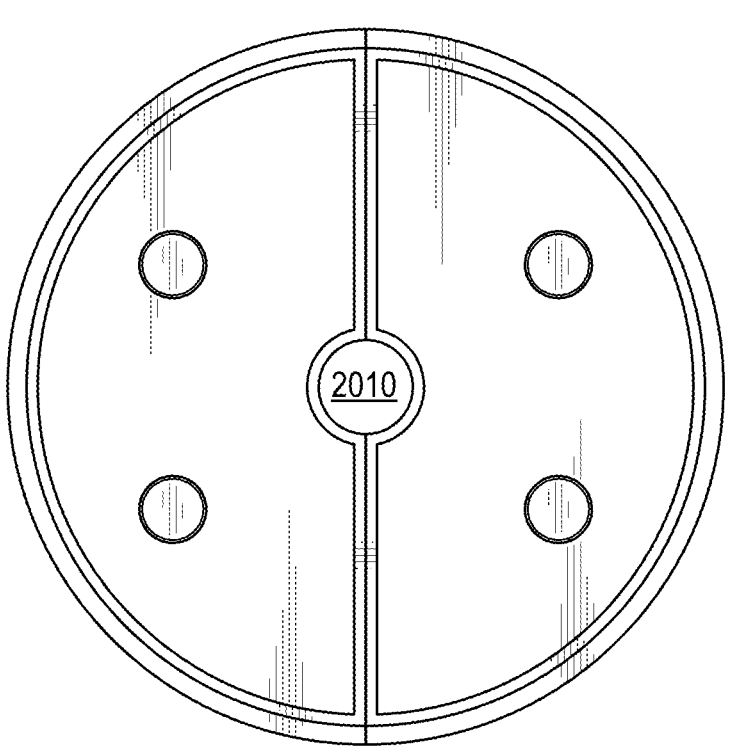
FIG. 20

2100

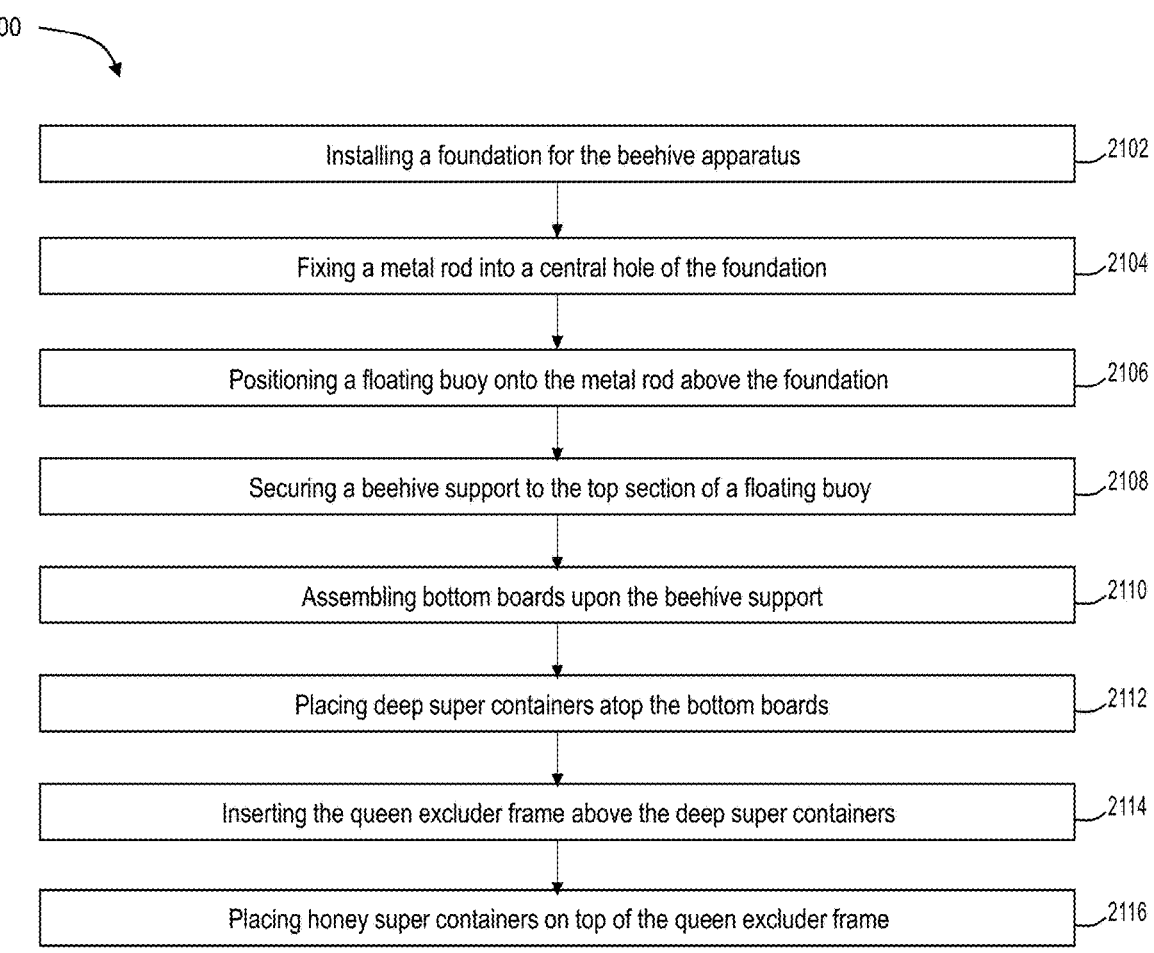

Installing a foundation for the beehive apparatus ⎯2102

Fixing a metal rod into a central hole of the foundation ⎯2104

Positioning a floating buoy onto the metal rod above the foundation ⎯2106

Securing a beehive support to the top section of a floating buoy ⎯2108

Assembling bottom boards upon the beehive support ⎯2110

Placing deep super containers atop the bottom boards ⎯2112

Inserting the queen excluder frame above the deep super containers ⎯2114

Placing honey super containers on top of the queen excluder frame ⎯2116

FIG. 21

BUOYANT MODULAR BEEHIVE APPARATUS

TECHNICAL FIELD

The present invention relates generally to apiculture equipment and, more particularly, to a modular and buoyant beehive apparatus and method of assembly thereof, designed to remain functional in multiple climatic conditions.

INTRODUCTION

Beehives include structures in which bees are housed to collect their honey and to provide a secure place for them to breed and live. Traditional beehives have been constructed from various materials, including wood, and are designed to be placed in a stationary location conducive to the bees' foraging and temperature regulation needs.

The conventional beehive system includes a base, a series of stackable boxes containing frames for honeycombs, and covers to protect against the elements. The stationary nature of these systems has generally been considered suitable for the purposes of beekeeping.

However, the stationary design presents challenges under changing environmental conditions. With the increasing occurrence of extreme weather events, such as torrential rains and flooding, conventional beehive systems are facing new risks. Flooding, in particular, poses a substantial threat to hives situated in low-lying areas or floodplains.

During flooding events, these beehives are often completely or partially submerged, leading to the loss of the bee colonies and honey production. This results in considerable losses to beekeepers from the destruction of hives and the associated loss of income from honey and beeswax.

The problem is exacerbated when considering that most hives are constructed of materials like wood, which are susceptible to water damage. Once waterlogged, wooden hives become difficult to restore to a functional condition and may lead to the abandonment of the hive by surviving bees.

Furthermore, stationary beehives do not offer the flexibility needed to quickly adapt to the rapidly changing conditions that are becoming more common with climate change. Once placed, these stationary hives are not designed to be easily moved or modified, thereby limiting the beekeeper's ability to respond to environmental threats.

Accordingly, systems, methods, and devices are desired that overcome one or more disadvantages associated with existing beehives, and particularly towards an improved beehive system that may withstand the effects of extreme weather.

SUMMARY

Provided is a beehive apparatus including a securing mechanism for anchoring the beehive apparatus to a ground surface, a buoyancy component situated above the securing mechanism and for floating and rising with a water level, and a plurality of honey harvesting components positioned atop the buoyancy component. The storage components house bees and store honey above the water level.

The securing mechanism may include a rod extending vertically and a foundation secured within the ground, the foundation having a central opening to receive the rod.

The rod may operate as a solar power generation unit. The rod may include solar panels. The rod may include an internally wired opening to provide electrical connectivity to the solar panels. The opening may also function as any one or more of a meteorological unit, a weather unit, or a general outdoor data collection point.

The beehive may include deep super containers in the honey harvesting components, the deep super containers for brooding.

The deep super containers may include internal ledges to support deep super frames.

The beehive apparatus may include honey super containers in the honey harvesting components, the deep super containers configured for honey storage wherein the honey super containers include internal ledges to support honey super frames, and wherein the honey super containers are located above the deep super containers.

The honey harvesting components may include an entrance for allowing bees to enter the brooding area within the deep super containers.

The beehive apparatus may include a queen excluder frame positioned between the deep super containers and the honey super containers.

The queen excluder frame may include an excluding net for restricting the travel of a queen bee and drones to a honey storage area in the honey super containers.

The queen excluder frame may include a central opening aligned with the through-holes of the deep super containers and honey super containers to provide axial alignment of the honey harvesting components.

The beehive apparatus may include inner cover components. The inner cover components may be positioned above the honey super containers.

The beehive apparatus may include outer cover components. The outer cover components may be positioned above the inner cover components. The outer cover components may seal the beehive apparatus from external elements.

The outer cover components may include an overhang for directing precipitation and debris away from the entrance of the bee and honey storage components.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of systems, methods, and devices of the present specification. In the drawings:

FIG. 20 shows a bottom assembled view of the outer covers of the beehive apparatus, according to an embodiment.

FIG. 21 is a flowchart on method of assembly of the beehive apparatus, according to an embodiment.

DETAILED DESCRIPTION

Figure 1:
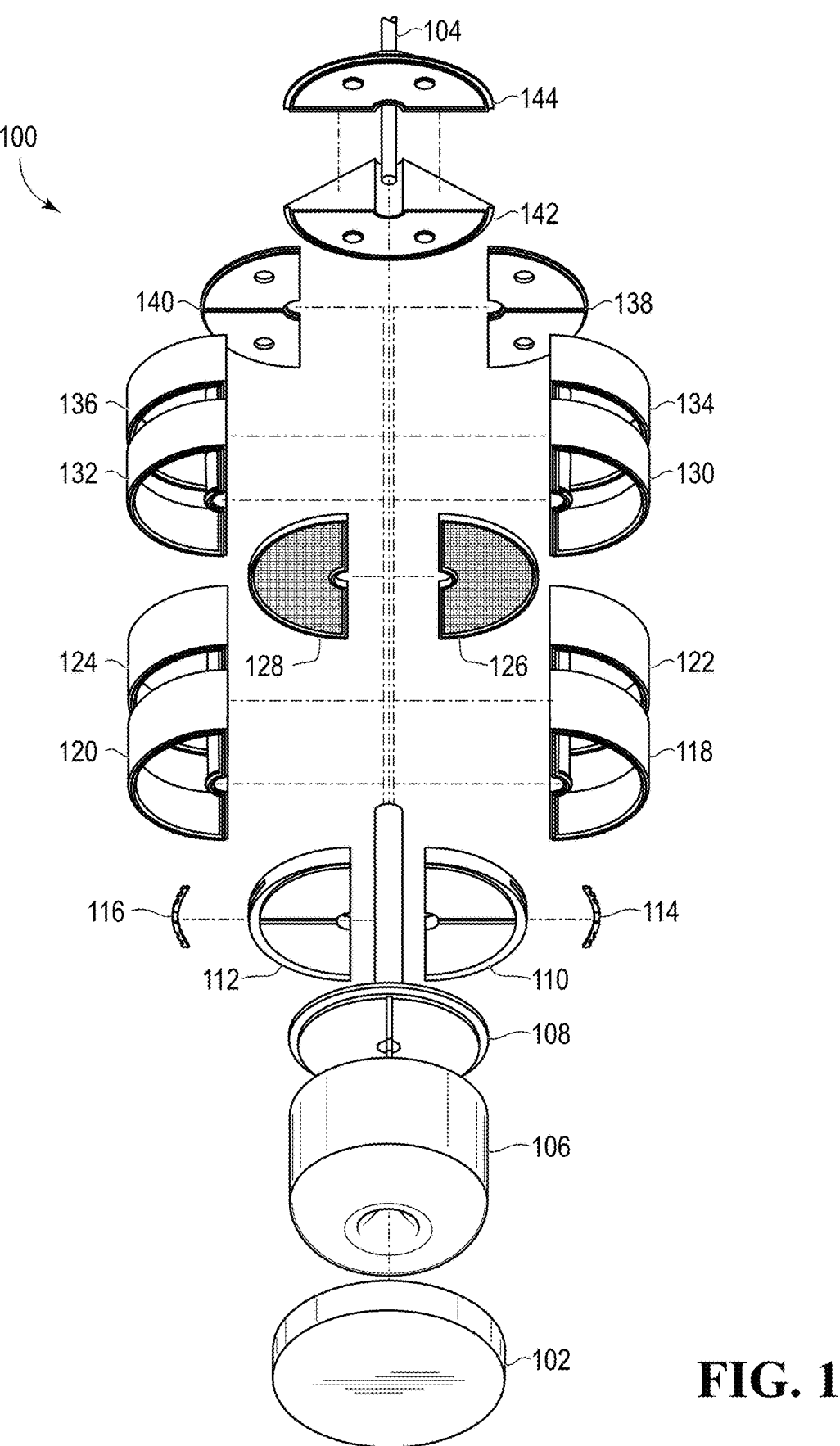
FIG. 1 shows a perspective exploded view of the beehive apparatus, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

A description of an embodiment with several components in connection with each other does not imply that all such components are required. On the contrary, a variety of optional components are described to illustrate the wide variety of possible embodiments of the present invention.

Further, although process steps, method steps, components or the like may be described (in the disclosure and/or in the claims) in a sequential order, such processes, methods and components may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of more than one device or article.

While the present apparatus and processes have been described with reference to particular embodiments, it should be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

In this regard, the scope of the present apparatus and processes is not limited to the specific embodiments disclosed herein. Other variations, modifications, and alternatives are also within the scope of the present apparatus and processes. The appended claims are intended to cover such variations, modifications, and alternatives as fall within their true spirit and scope.

Additionally, the detailed description of the embodiments and the drawings are illustrative and not restrictive.

The present disclosure pertains to a modular floating beehive apparatus and method of assembly thereof, designed to address the challenges posed by environmental conditions such as flooding. In addition to other advantages, the beehive is configured to float and rise with the water level during flooding, thereby preserving the integrity of the hive and the safety of the bee colony.

According to an embodiment, the main body of the beehive apparatus comprises multiple modular and removable sections, each fulfilling a purpose, such as storing bees, brood, and honey. The components may be designed with a tubular shape, which enables them to shift or rotate with the water current, minimizing structural stress and potential damage. The tubular design also facilitates the natural movement of the hive with the direction of water flow, providing stability in the fluid environment. The main body includes the beehive components intended to rise with the water levels. The main body includes one or more of floating buoy component 500, beehive support structure 600, bottom board 800, entrance reducer 900, deep super container 210, queen excluder frame 214, honey super container 216, inner covers 220, and outer covers 222. Components in the main body are vertically guided by a resilient rod 104 based on changes in water level.

According to an embodiment, the main body is constructed from high-density polyethylene (HDPE) or equivalent materials, chosen for their buoyancy, resistance to water, and durability. HDPE or another suitable material may be selected that combines the features of being lightweight for easier buoyancy. HDPE also allows the construction of thinner and stronger structural components than those typically achievable with wood. As less volume of materials is preferred for the beehive disclosed, the volume of HDPE required is less than that of wood needed for a comparable structure. Therefore, the overall assembly is lighter when constructed with HDPE as opposed to traditional wooden components, thereby enhancing the buoyancy and portability of the beehive system. HDPE's water resistance is beneficial for the longevity of the hive in wet conditions. Further, the surface properties of HDPE allow for easy cleaning with chemicals to ward off natural predators of bees. Moreover, the material allows for rapid molding and manufacturing, which may be sourced from recycled materials, aligning with sustainable practices.

According to an embodiment, the apparatus features a bottom removable component that acts as a floating buoy. The bottom removable component is also referred to as the floating buoy section or floating buoy component. The bottom removable component is completely or partially hollow to provide buoyancy and allows the entire hive to elevate with rising water levels. Moreover, the design provides that the entrance to the bee and honey compartments remains above the water, inhibiting flooding within the hive.

According to an embodiment, a plurality of components of the main body as described herein and the ancillary modules, are designed with a longitudinally extending through-hole. The through-hole accommodates a metal rod that may serve multiple functions. The through-hole may also accommodate the hollow pipe 620 extending in the beehive support structure 600. In an embodiment, the metal rod 104 is removably fixed to a foundation 102 and provides lateral stability and anchors the main body of the beehive. Despite being anchored, the main body may be capable of vertical mobility along the rod 104, allowing the main body of the beehive to ascend with rising water without generating friction. The rod 104 may guide the rise of the main body of the beehive with the water level while inhibiting the main body from drifting away or becoming submerged.

According to an embodiment, the beehive (or "hive") apparatus' circular or tubular shape and modular nature allow for flexibility and adaptability in assembly and maintenance. Each component of the beehive apparatus' may be replaced or modified as required, and the circular or tubular design aids in the hive's orientation and movement in response to water currents. According to an embodiment, the hive's cross section reveals a completely or partially hollow interior with support structures. The floating buoy section, in addition to other components of the main body, provides the buoyancy potential necessary to elevate the hive during floods. The design supports the entire beehive structure and ensures that access to the bee and honey storing sections is preferably above the anticipated water level.

Figures 22A, 22B:
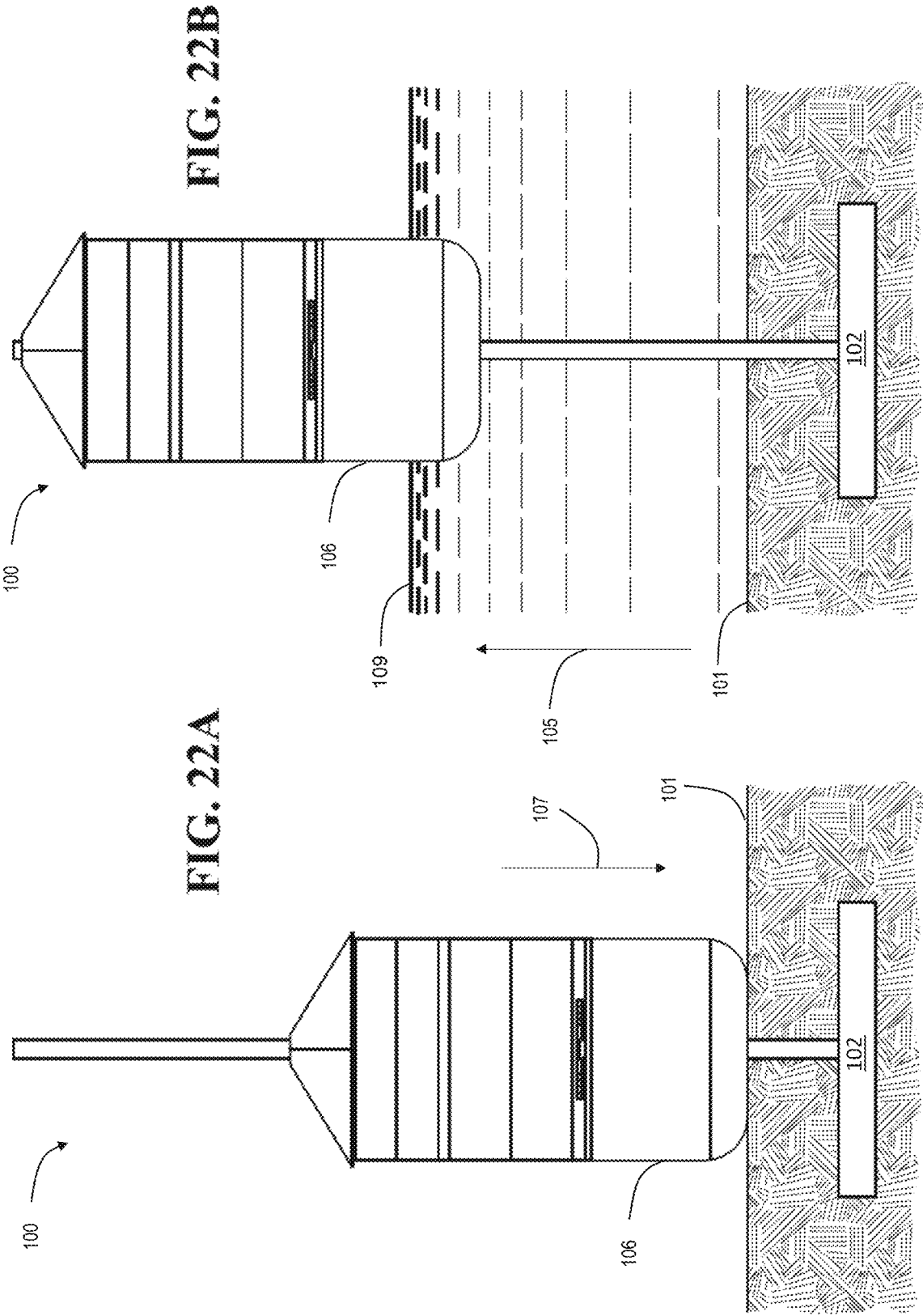
FIGS. 22A and 22B illustrate the beehive apparatus of FIG. 1 in a first position and second position, respectively.

FIGS. 1, 22A and 22B show a beehive apparatus 100, according to an embodiment. The beehive apparatus 100 includes a foundation 102. The foundation 102 of the beehive apparatus 100 may be constructed of concrete or other suitable material to provide required weight and stability, and ability to withstand the natural forces of wind, rain, flooding, waves, and strong currents. The foundation 102 operates as a base for the beehive apparatus 100. The foundation 102 may be positioned beneath the soil 101.

Preferably, the foundation 102 is positioned at a subsurface level within the ground for stability of the beehive structure. The foundation 102 secures the beehive structure in place, offering resilience against environmental disturbances. The foundation 102 anchors the beehive apparatus 100, inhibiting displacement due to water movement or other forces.

The beehive apparatus 100 includes a rod 104. The rod 104 extends from the foundation 102, and serves as the central axis around which the beehive apparatus 100 is organized. The rod 104 is constructed from resilient materials such as steel to provide required stability, and ability to withstand the natural forces of wind, rain, flooding, waves, and strong currents. The rod 104 may impart lateral stability while facilitating vertical movement, to the beehive apparatus 100 enabling the hive to adapt to rising water levels without constraint. The foundation 102 and the rod 104 collectively form a securing mechanism configured to anchor the beehive apparatus 100 to a ground surface.

The beehive apparatus 100 includes a floating buoy 106, also referred to as floating section or floating component. The floating buoy 106 is a cylindrical component placed at the base of the beehive apparatus 100 above the foundation 102. The floating buoy 106 is configured to operate as a buoyancy-inducing component situated above the securing mechanism or foundation, and configured to float and rise with the water level. The hollow and airtight construction with optional internal support components of the floating buoy 106 may provide the buoyancy needed for the main body to ascend in response to flooding, ensuring that the main body remains elevated above water. The floating buoy 106 may directly interact with the water body, allowing for natural flotation and movement with the water current.

FIG. 22A illustrates the beehive apparatus 100 in a first position where the floating buoy 106 is not floating and resting on the ground 101. FIG. 22B illustrates the beehive apparatus 100 in a second position where the floating buoy 106 is floating at the surface of the water 109. The beehive apparatus 100 is able to move up 105 with an increase in water level, and down 107 with a decrease in water level.

The beehive apparatus 100 includes a beehive support 108. The beehive support 108 is situated above the floating buoy 106 and secures the structural components of the beehive apparatus 100 that rest upon the beehive support 108, as shown in FIG. 1. The beehive support 108 may act as a platform for the precise placement of the subsequent modules or components placed over the beehive support 108. The beehive support 108 includes a lateral duct or pipe extending from the center of the platform.

The beehive apparatus 100 includes a bottom board formed by semicircular segments 110, 112. The bottom board includes a secure resting platform with a central opening for receiving the metal rod 104. The bottom board may provide for the entry and exit of bees through an opening (not shown). Entrance reducers 114, 116 are inserted into the openings of the bottom board to regulate the entry and exit of bees. Entrance reducers 114, 116 therefore manage the hive's 100 internal environment. By blocking the majority, but not the entirety, of the hive entrance, the reducers 114, 116 control the movement of bees, allowing the apiculturist to adjust the hive's accessibility in response to seasonal variations or specific environmental conditions. The selective accessibility provides for maintaining internal heat during colder conditions, effectively slowing hive activity and preventing mass die-offs by conserving warmth within the hive.

The beehive apparatus 100 includes one or more deep super containers formed by semicircular deep super segments 118, 120, 122, 124. The deep super container is positioned above the bottom board 110, 112. The deep super containers house the brood and operate as the central living quarters for the bees. The deep super containers provide the space for brood rearing and contribute to the overall health of the hive. The deep super container is configured to fit vertically along and flush with the beehive support 108. While the deep supers containers move vertically, the movement is facilitated primarily by the floating buoy 106 operating as the enabling feature. The deep super segments 118, 120, 122, 124 are closely integrated with the beehive support 108. The beehive support 108 moves along the rod 104, indicating a synergistic interaction among deep super segments 118, 120, 122, 124, and beehive support 108. This arrangement ensures that the deep super container(s) maintain alignment and stability relative to the beehive support 108, thereby optimizing the structural integrity and functional efficacy of the entire beehive apparatus.

The beehive apparatus 100 includes a queen excluder frame formed by assembling the semicircular queen excluder segments 126, 128. The queen excluder frame is placed atop the deep super container(s). The queen excluder frame includes an excluding net (described below) designed to segregate the queen bee from the honey super containers. The excluding net facilitates the harvesting of clean honey by restricting the queen bee's access to honey storage areas, allowing worker bees to pass while excluding the queen.

The beehive apparatus 100 includes one or more honey super containers formed by semicircular deep super segments 130, 132, 134, and 136. The honey super container is positioned above the queen excluder frame. The honey super containers provide storage for honeycombs and provide a place for pure honey. The honey super containers restrict the queen bee from laying eggs in the honey, thereby preserving the purity of the produced honey for uncomplicated harvest.

In an embodiment, the honey super container(s) are configured for honey harvesting. Honey super container(s) are the compartments where the majority of honey is stored and later collected. In contrast, the deep super container(s) are configured as brood boxes within the hive apparatus. The deep super container(s) operate as the nursery areas of the hive apparatus, where the queen bee is often housed and where brood rearing occurs. Thus, the deep super container(s) are primarily concerned with the production aspects of the hive's lifecycle and overall hive health.

The beehive apparatus 100 includes an inner cover formed by semicircular inner cover segments 138, 140. The inner covers seal the topmost honey super container, protecting the interior of the hive from environmental elements and providing an additional layer of insulation. The inner covers include openings that are external to the inner hive components for ease of removal, and serve as an intermediary layer to support the outer covers.

The beehive apparatus 100 includes an outer cover formed by semicircular outer cover segments 142, 144. The outer covers are placed on top of the inner covers. The outer covers may be designed in a conical shape and sloped design. The shape may aid in directing precipitation and debris away from the hive 100. The outer covers include cylindrical inserts that lock into the openings of the inner covers to maintain the integrity of the protective seal.

Figure 2:
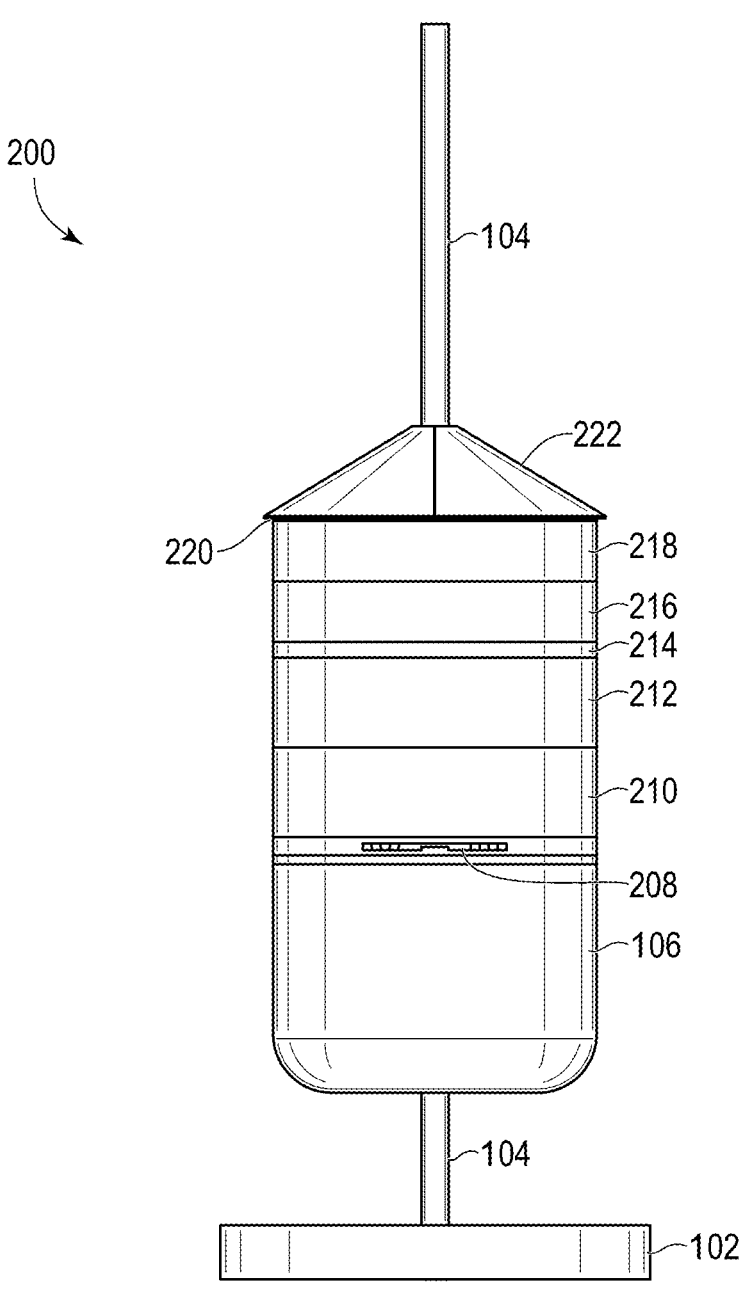
FIG. 2 shows a perspective assembled view of the beehive apparatus, according to an embodiment.

FIG. 2 shows a perspective assembled view of the beehive apparatus 200, according to an embodiment.

The beehive apparatus 200 includes a foundation 102. The foundation 102 may be the foundation 102 of FIG. 1. The beehive apparatus 200 includes a rod 104. The rod 104 may be the rod 104 of FIG. 1. The beehive apparatus 200 includes a floating buoy 106. The floating buoy 106 may be the floating buoy 106 of FIG. 1. The beehive apparatus 200 includes a bottom board 208. The bottom board 208 may be the bottom board of FIG. 1. The beehive apparatus 200 includes deep super containers 210, 212. The deep super containers 210, 212 may be the deep super containers of FIG. 1. The beehive apparatus 200 includes a queen excluder frame 214. The queen excluder frame 214 may be the queen excluder frame of FIG. 1. The beehive apparatus 200 includes honey super containers 216, 218. The honey super containers 216, 218 may be the honey super containers of FIG. 1. The beehive apparatus 200 includes an inner cover 220. The inner cover 220 may be the inner cover of FIG. 1. The beehive apparatus 200 includes an outer cover 222. The outer cover 222 may be the outer cover of FIG. 1.

Figures 3A, 3B:
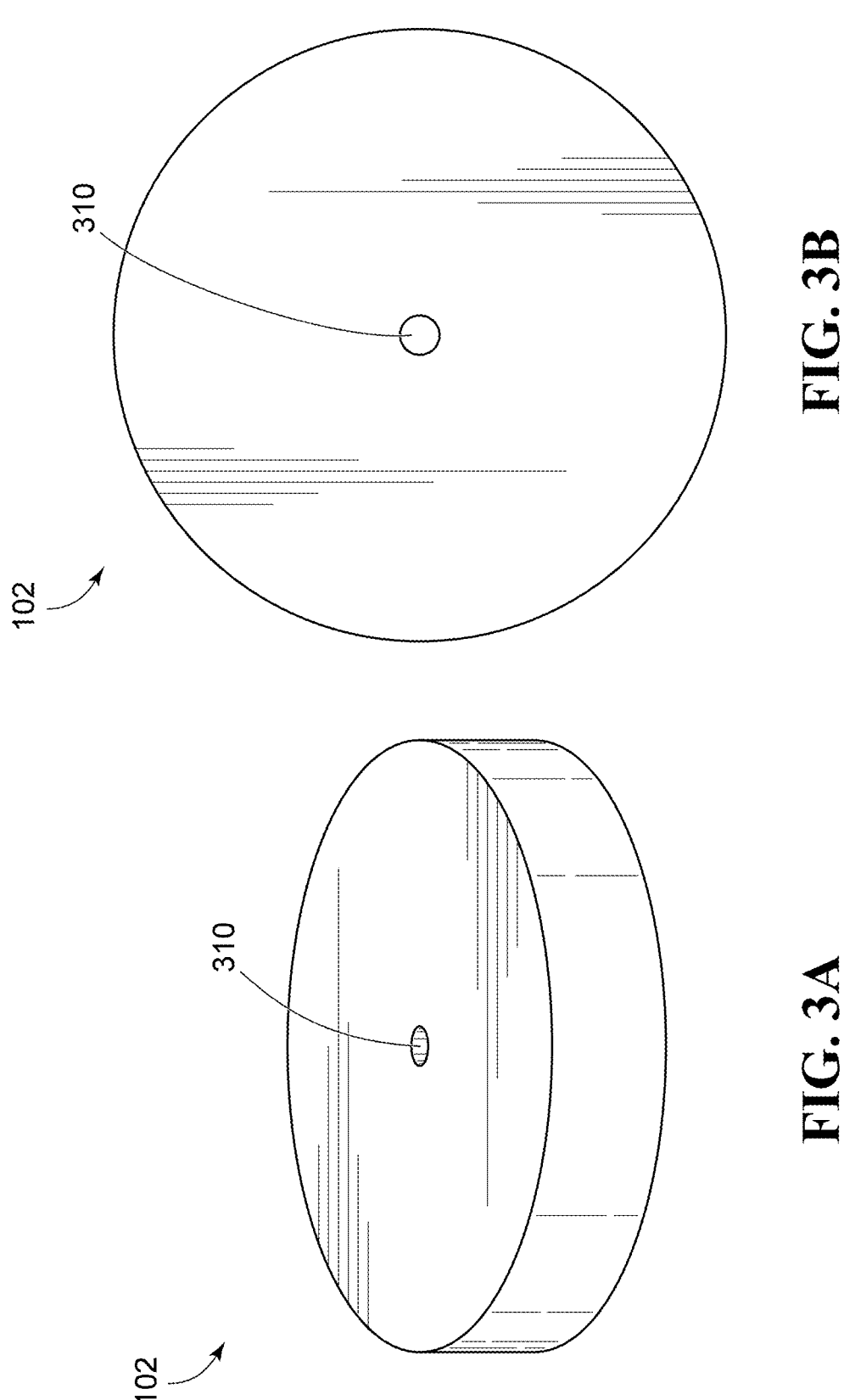
FIG. 3A shows a side perspective view of the foundation of the beehive apparatus, according to an embodiment.
FIG. 3B shows a top perspective view of the foundation of the beehive apparatus, according to an embodiment.

FIG. 3A shows a side perspective view of the foundation 102 of the beehive apparatus, according to an embodiment. FIG. 3B shows a top perspective view of the foundation 102 of the beehive apparatus, according to an embodiment.

According to an embodiment, the foundation 102 is designed as a thick cylindrical disc or cubical block. According to an embodiment, the foundation includes a central through-hole 310 configured to accommodate a metal rod. The foundation 102 provides a secure anchor point for the beehive apparatus 100.

According to an embodiment, the foundation 102 is constructed from standard concrete. The foundation's 102 cylindrical or cubic form may be chosen for the foundation's 102 strength and stability. However, the foundation 300 is not limited to this shape or material. Alternative embodiments may utilize other geometric shapes, and the materials may vary based on availability, cost, environmental factors, or specific user requirements. Possible alternatives include but are not limited to precast concrete, a blend of concrete and recyclable materials, or advanced composites that provide equivalent structural integrity.

According to an embodiment, the central through-hole 310 is configured to receive a resilient rod (described below). The resilient rod may extend upward to interact with the floating beehive components. The diameter and depth of the hole 310 are optimized to ensure a snug fit for the resilient rod, allowing for minimal lateral movement and maximum vertical guidance. In an embodiment, instead of a through-hole, drying concrete may be placed upon receiving the rod at the central region of the foundation 102.

According to an embodiment, the foundation 102 during installation is securely placed several feet below the ground to anchor the beehive apparatus 100 in areas with a high-water table or areas that may experience periods of dense flooding. The subterranean placement provides that the foundation 102 remains unaffected by soil erosion or water movement. In other embodiments, especially where a high-water table is not a concern, the foundation 102 may be positioned on the surface, with or without additional securement measures such as anchoring stakes or a broader base for increased stability against lateral forces. While the subsurface installation provides higher stability and durability for the hive apparatus, surface level placement and securement may be provided where transition or lateral movement of the hive is expected.

The dimensions and mass of the foundation 102 may be calibrated to provide sufficient ballast to counterbalance the buoyant forces of the floating components of the beehive 100. The counterbalance may provide for the beehive 100 remaining upright and anchored during a flood event.

Figure 4:
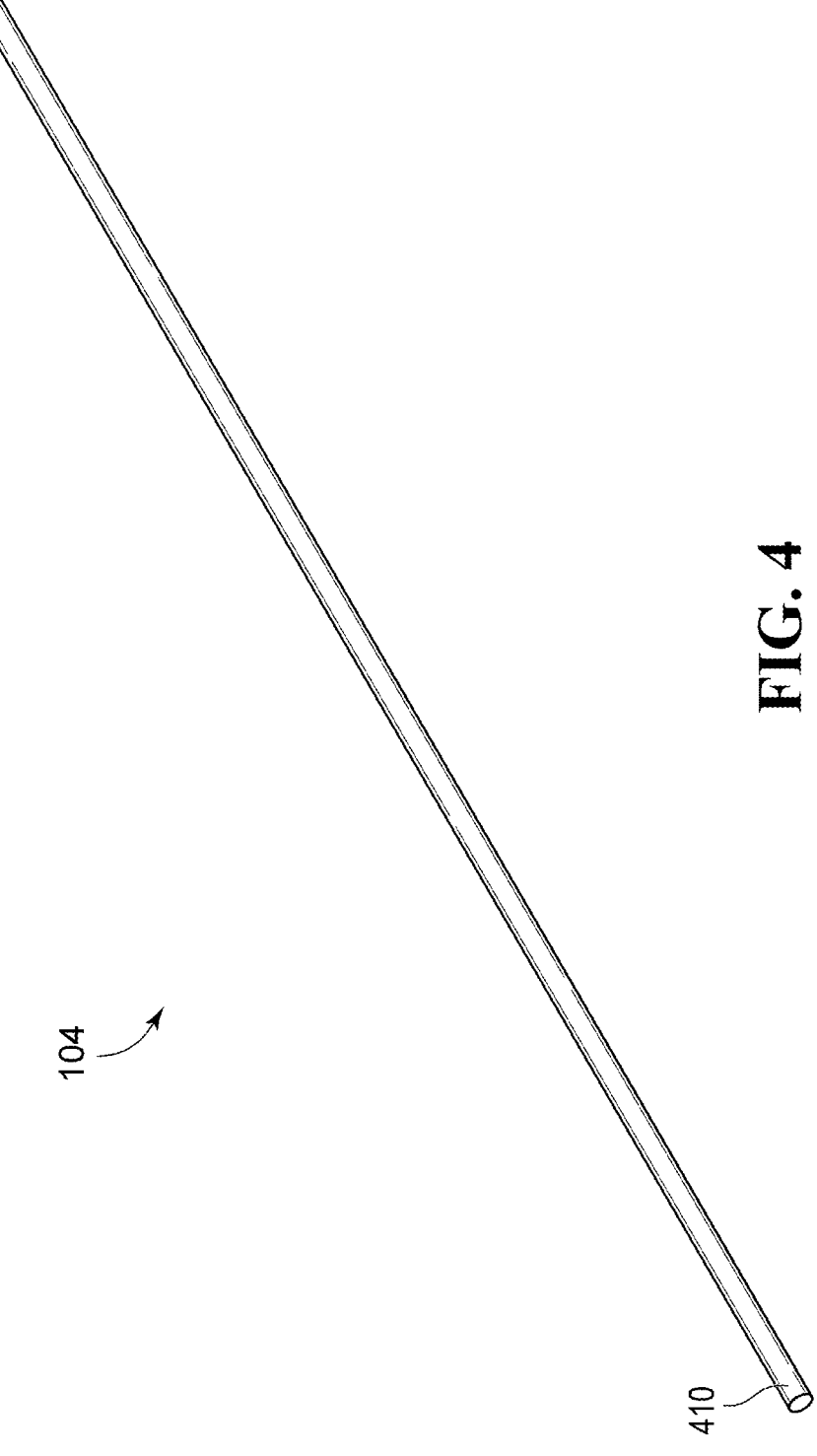
FIG. 4 shows a side perspective view of the resilient rod of the beehive apparatus, according to an embodiment.

FIG. 4 shows a perspective side view of a resilient rod 104 of the beehive apparatus 100, according to an embodiment.

The resilient rod 104 extends longitudinally from the foundation 102 to offer rigidity and stability to the beehive components while allowing for vertical movement for the beehive components during flooding events.

According to an embodiment, the preferred material for the construction of the resilient rod 104 is steel due to the material's high strength and resilience under stress. However, alternative corrosion-resistant materials with comparable properties, such as galvanized steel, stainless steel, coated aluminum alloys, or non-metal rigid materials, may be substituted to achieve similar functionality. The selection of material may be made to ensure the longevity and strength of the rod 104 in various environmental conditions, especially in moist or corrosive atmospheres typically associated with beekeeping and outdoor environments.

According to an embodiment, the resilient rod 104 is attached to the foundation 102. The rod 104 may extend vertically from the central cavity 310 of the foundation 102 and extend several feet above the ground. The height of the resilient rod 102 is variable and may be determined based on factors such as the local water levels, anticipated flood levels, and the local water table. The customization may provide for adaptability of the beehive apparatus 100 to specific geographic and climatic conditions.

According to an embodiment, the resilient rod 104 is securely connected to the middle hole 310 or drying concrete of the concrete foundation 102, at a connection point 410 of the rod 104. The resilient rod 104 may be configured to detachably fix to the hole 310 in the foundation 102, providing flexibility in assembly and maintenance. Various alternative means of fixing the rod 104 to the foundation 102 are possible, including threading, bolting, welding, or using a locking mechanism. The choice of fixing method may be determined by the need for permanence or the option for disassembly. For instance, a threaded connection might be used for easier disassembly, whereas welding could be employed for a more permanent and robust joint.

According to an embodiment, the resilient rod 104 is perpendicular to the lateral anticipated water surface level. The perpendicular orientation provides for the rod 104 to effectively guide, control the movement of, and level the beehive support structure (described below) during the vertical movements caused by changes in water levels.

Advantageously, the resilient rod 104 functions as a "central spine" of the beehive apparatus 100. The rod 104 provides the vertical guidance and control necessary for the floating beehive structure 100 to maintain the hive's position and orientation, especially during flood conditions.

Figure 5:
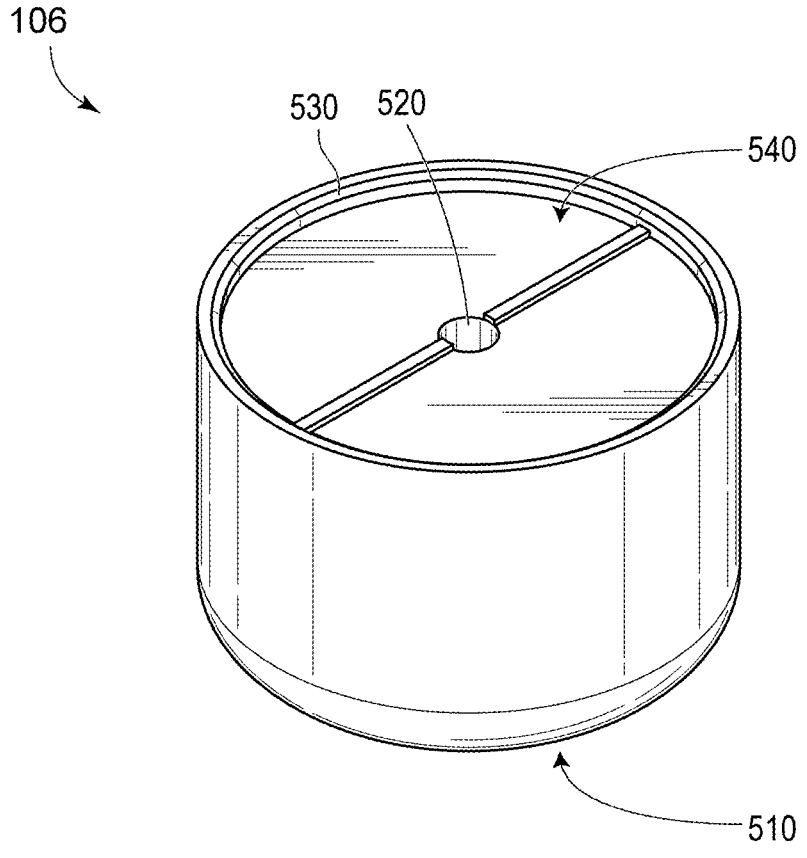
FIG. 5 shows a side perspective view of the floating buoy of the beehive apparatus, according to an embodiment.

FIG. 5 shows a side perspective view of the floating buoy 106 of the beehive apparatus, according to an embodiment.

The floating buoy 106, also referred to as the floating section, or buoy, or buoy-able compartment, or bottom removable component, provides buoyancy and support to the main body of the beehive structure 100. According to an embodiment, the floating buoy 106 is composed of a cylindrical shape with a hollow internal section with supports for rigidity. The floating buoy 106 may be designed to encase the central metal rod 104 while maintaining minimal contact to reduce abrasion and friction.

According to an embodiment, the floating buoy 106 is positioned as the lowest compartment of the main body of the beehive apparatus 100 to maintain direct contact with the water. The placement of the floating buoy 106 allows that the components of the main body (i.e., the beehive apparatus 100 except the foundation 102 and the metal rod 104), are arranged above the floating buoy 106. Advantageously, floating buoy 106 may keep the other components of the main body elevated above water level due to the buoyant uplift provided by the buoy 106. The configuration of placing the buoy 106 as the lowest compartment allows the hive 100 to dynamically respond to fluctuating water levels, ensuring the bee colony within the main body preferably remains dry and secure, while the buoy 106 directly interfaces with the water. The buoy 106 provides that the main body of the floating beehive structure 100 may rise and fall with the tide. However, in the event of dry conditions, the floating buoy 106 may contact the ground surface.

According to an embodiment, the floating buoy 106 is constructed from High-Density Polyethylene (HDPE) or an equivalent material preferably with marine buoy certification. HDPE or another suitable material may be selected that combines the features of being lightweight for easier buoyancy. HDPE also allows the construction of thinner and stronger structural components than those typically achievable with wood. As less volume of materials is preferred for the beehive disclosed, the volume of HDPE required is less than that of wood needed for a comparable structure. Therefore, the overall assembly is lighter when constructed with HDPE as opposed to traditional wooden components, thereby enhancing the buoyancy and portability of the beehive system. The construction material for the floating buoy 106 may be selected for the material's durability, strength, and buoyancy. HDPE is preferred due to the material's resistance to water, environmental stress cracking, and the material's ability to be molded into complex shapes. The use of alternative materials is based upon meeting the weight, strength, and buoyancy criteria required for the floating buoy 106.

In addition to the primary material of construction, the floating buoy 106 may be treated with eco-friendly deterrents to dissuade natural predators, enhancing the survival rate of the bees. Such deterrents may include formulated sprays or substances that repel pests without harming the bees or the environment.

According to an embodiment, the floating buoy's 106 hollow construction includes support structures (not shown) that contribute to the buoy's 106 strength and buoyancy. The hollow structure may be rendered airtight, providing the option of being filled with a mixture of air and helium or other gases to adjust the buoyancy, enabling the beehive 100 to respond to varying water levels efficiently.

According to an embodiment, the floating buoy 106 is designed to rotate with the water flow. The rotation allows the floating buoy 106 to align smoothly with the current, thereby minimizing resistance and potential damage during flood conditions. This rotational ability also aids in the self-orientation of the beehive 100, a feature that may be beneficial in dynamic water environments.

According to an embodiment, the base 510 of the floating buoy 106 is rounded both internally and externally. The rounded base 510 provides for improved buoyancy and allows the beehive apparatus 100 to rest stably on the ground when there is no flooding. In this non-buoyant state, the metal rod 104 extends through the beehive structure 100, holding the floating buoy 106 in place.

According to an embodiment, the floating buoy 106 includes a through hole or passage or tunnel 520. The through hole 520 allows the metal rod 104 to pass through the floating buoy 106. The through hole 520 has a greater internal diameter compared to the metal rod 104 to ensure a clearance that allows for unobstructed vertical movement. The differential in the diameter may inhibit any potential jamming, abrasion, or hindrance to the ascending or descending motion of the beehive 100 during water level changes.

The floating buoy 106 may support the weight of the beehive structure 100, including the beehive support component 600 (described below), which attaches to the floating buoy 106. According to an embodiment, the beehive support component 600 (described below) secures to the floating buoy 106 via weight and gravity-assisted tongue and groove joints 530 at the top section 540 of the floating buoy. The tongue and groove joints 530 provide a secure and stable method of assembly while allowing for quick disassembly and reassembly if necessary, facilitating maintenance and modular customization of the beehive.

Advantageously, the floating buoy 106 is designed to offer both static support and dynamic response to environmental changes. The buoyancy allows the beehive 100 to rise with water levels, ensuring the safety of the bee colony during floods.

Figure 6B:
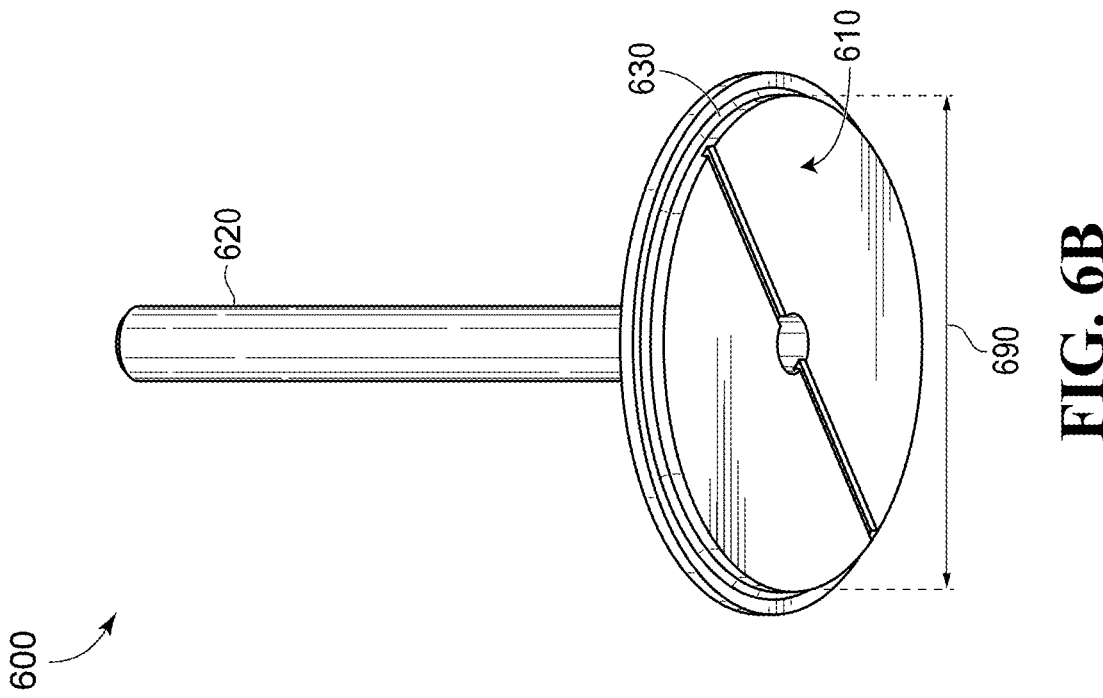
FIG. 6B shows a bottom side perspective view of the beehive support of the beehive apparatus, according to an embodiment.
Figure 6A:
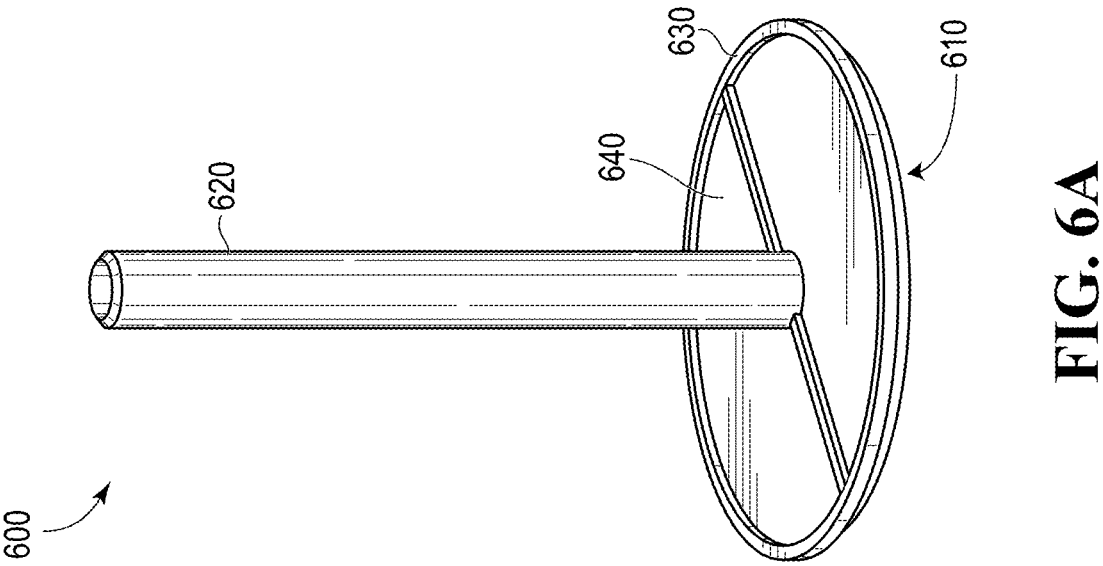
FIG. 6A shows a top side perspective view of the beehive support of the beehive apparatus, according to an embodiment.

FIG. 6A shows a top perspective view of the beehive support 600 of the beehive apparatus, according to an embodiment.

FIG. 6B shows a bottom perspective view of the beehive support 600 of the beehive apparatus, according to an embodiment.

The beehive support 600 provides a platform to support the components in the main body of the beehive apparatus 100 stacked on top of the beehive support 600.

According to an embodiment, the beehive support 600 interfaces with the floating buoy 106, by attaching the base 610 of the beehive support 600 with the tongue and grove joint 530 at the top section 540 of the floating buoy 106. The internal diameter 690 of the beehive support 600, matches that of the floating buoy 106 to provide a consistent, smooth transition between these two components and maintaining the integrity of the overall structure.

According to an embodiment, the beehive support, or the beehive support component 600 is composed of a circular base plate 610 with a centrally positioned hollow pipe or a hollow cylinder 620 that extends perpendicularly. The pipe 620 has a curvature designed to envelop the rod 104, forming a secure connection that is both vertical and central to the apparatus 100.

According to an embodiment, the beehive support component 600 is constructed with High-Density Polyethylene (HDPE) material. Alternative materials may be used, which are preferably marine use-certified to provide durability, strength, and buoyancy. HDPE or another suitable material may be selected that combines the features of being lightweight for easier buoyancy. HDPE also allows the construction of thinner and stronger structural components than those typically achievable with wood. As less volume of materials is preferred for the beehive disclosed, the volume of HDPE required is less than that of wood needed for a comparable structure. Therefore, the overall assembly is lighter when constructed with HDPE as opposed to traditional wooden components, thereby enhancing the buoyancy and portability of the beehive system. The materials may be selected for their robustness and suitability for the marine environment, which may include exposure to water, UV radiation, and varying temperatures.

According to an embodiment, the beehive support component 600 rests atop the floating buoy 106. The beehive support component 600 may be removably fixed to the floating buoy 106 using a tongue and groove joint 630. Alternative joint selections may be made which are reliable and allow for some degree of movement and flexibility as required by changing environmental conditions. The choice of joining method provides for the modular nature of the apparatus 100, facilitating easy assembly and disassembly, as well as repair or replacement of individual components.

According to an embodiment, the beehive support 600 include a plurality of groove features 640. The groove features 640 accommodates and secures the modular components of the beehive apparatus 100.

According to an embodiment, the beehive support 600 includes a groove system 640 on the flat top. The groove system 640 is essential for supporting and aligning the modular components of the hive, such as the bottom boards (described below), which seamlessly click, snap, or slip into place within these grooves 640. The precise design of the grooves provides that each component securely locks into the correct position, maintaining the structural integrity and order of assembly.

According to an embodiment, the beehive support 600 dimensions are designed to host two separate colonies, allowing beekeepers to maximize the use of space and resources. The centrally running groove 640 organizes the main body of the hive into two distinct assemblies. The central groove 640 acts as a guide for positioning the bottom boards (described below) on either side of the groove. Each bottom board may 'click' into its designated slot within the groove system of the beehive support 600. Therefore, the configuration of the groove 640 in the beehive support 600 allows for the placement of two separate bottom boards (described below) atop the beehive support 600. Each bottom board is placed on either side of the groove 640, leading to the establishment of two distinct hives within the beehive apparatus. Each hive space is defined by its own set of deep supers (described below) that sit on the respective bottom boards. The placement ensures that each bottom board, and subsequently, the layers stacked above it, such as the deep super segments and honey super segments, are accurately aligned and securely fixed atop. As a result, two separate and independent hives are formed, starting from the bottom boards and extending upwards. The configuration prevents any interference between the colonies housed in each hive, as the division is maintained throughout the structure, from the base of the bottom boards to the uppermost layers of the hive. The design facilitates the independent management of each colony and maximizes the use of space within the beehive apparatus. The weight and pressure from the beekeeping components are evenly distributed across the main body for stability and balance.

The groove features 640 provides that the components of the beehive apparatus 100 such as bottom boards (described below), deep super segments (described below), queen excluder (described below), honey super segments (described below), inner and outer covers (described below) are accurately positioned and held firmly in place.

Additionally, the beehive support 600 is characterized by a curved "roof" at the top of its central hollow cylindrical structure 620 into which the internal rod extends. The curvature matches the slope of the outer covers (described below), effectively indicating the maximum assembly height and ensuring that the beehive structure adheres to designed height limitations.

The hollow pipe or cylinder 620 extending centrally in the beehive support 600 serves multiple functions. The pipe 620 may act as a conduit for the rod 104, allowing free vertical movement of the beehive 100 with water level changes. The pipe 620 also provides structural integrity to the beehive support 106. The hollow design reduces material usage without compromising strength, aligning with sustainable practices and cost-effectiveness.

According to an embodiment, the components of the main body of the hive 100 including honey super container 216, deep super container 210, queen excluder, 214, inner covers (described below), and outer covers (described below) interface with the pipe 620 of the beehive support 600. The pipe 620 houses the resilient rod 104. The pipe 620 operates as the primary structural element that maintains the central alignment of all components within the main body of the hive 100. The design ensures that the pipe 620, situated on the beehive support, serves as the primary conduit through which the resilient rod 104 extends, facilitating the vertical alignment and stability of the hive's 100 main body components as they are stacked upward and rise or fall with the water levels.

According to an embodiment, the curvature at the top of the hollow pipe or cylinder 620 within the beehive support corresponds with the slope of the outer covers, indicating the maximum assembly height for the beehive components. The design feature ensures that each module fits within the designated height, optimizing the structural cohesion of the assembled beehive.

Variations in the design of the beehive support 600 may accommodate different shapes and sizes of beehive components, offering flexibility to beekeepers who may have unique requirements or who wish to experiment with alternative beehive designs.

Advantageously, the beehive support 600 provides a support platform for the beehive components and contribute to the overall resiliency and modularity of the apparatus.

Figures 7A, 7B:
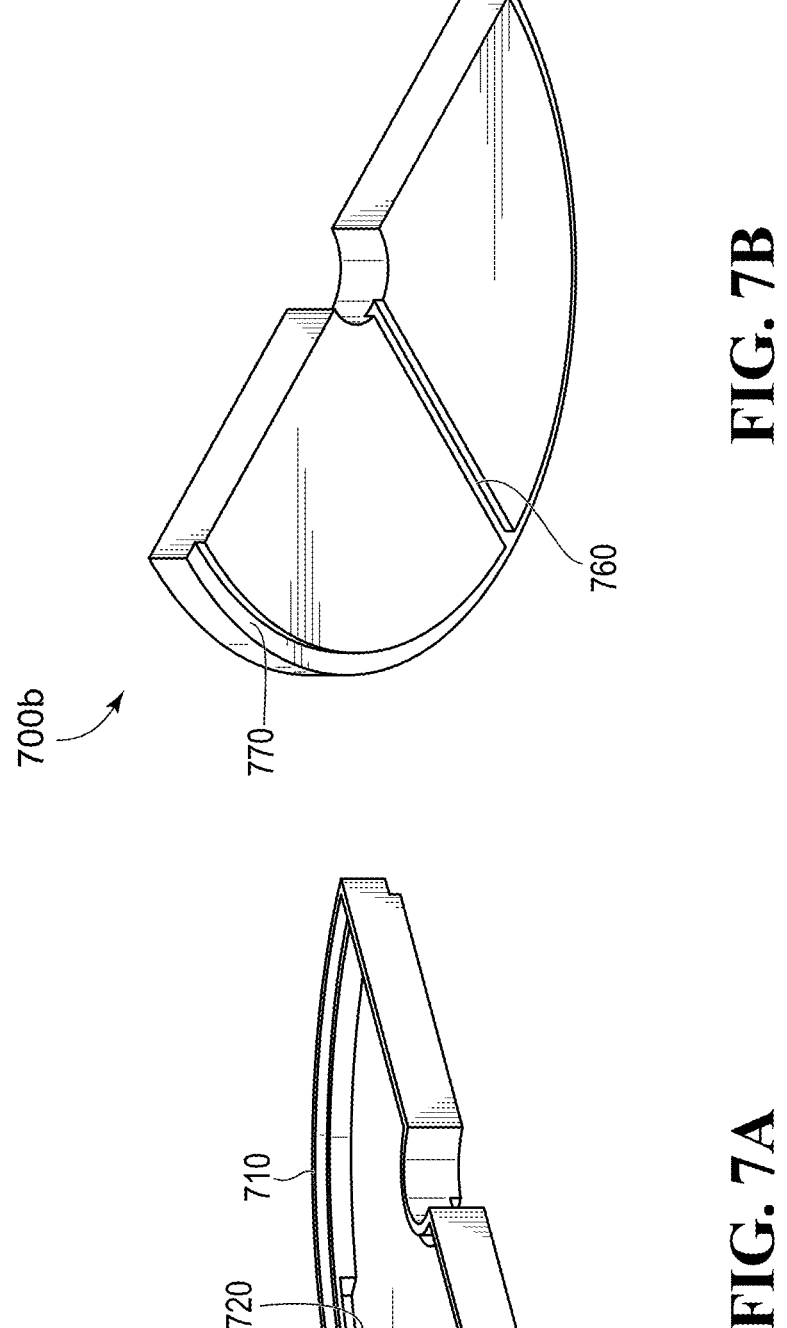
FIG. 7A shows a top side perspective view of a semicircular segment of the bottom board of the beehive apparatus, according to an embodiment.
FIG. 7B shows a bottom side perspective view of a semicircular segment of the bottom board of the beehive apparatus, according to an embodiment.

FIG. 7A shows a top side perspective view of a semicircular segment 700a of the bottom board of the beehive apparatus, according to an embodiment.

FIG. 7B shows a bottom side perspective view of a semicircular segment 700b of the bottom board of the beehive apparatus, according to an embodiment.

Figure 8:
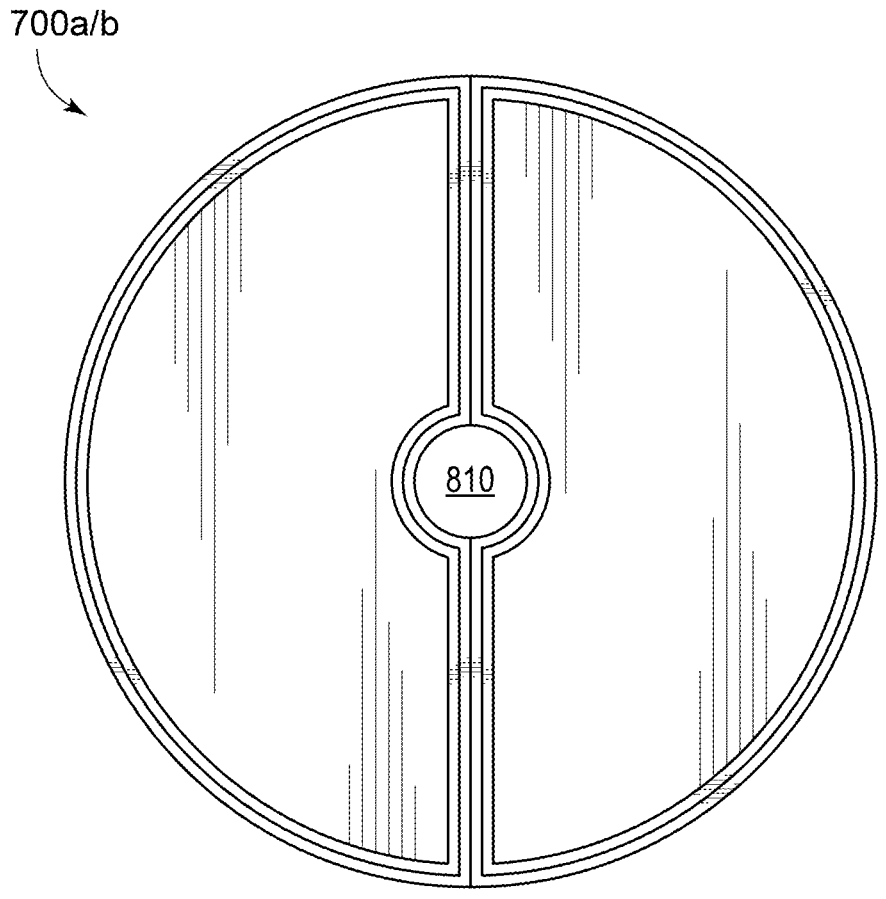
FIG. 8 shows a top assembled view of the bottom boards of the beehive apparatus, according to an embodiment.

FIG. 8 shows a top unassembled view of the bottom boards 800 of the beehive apparatus, according to an embodiment.

According to an embodiment, the bottom boards 700a, 700b provide an interface between the beehive entrance 720 and the internal structure. The bottom boards 700a, 700b in the beehive apparatus 100 are designed to provide an individual base for each of the two hive systems within the beehive apparatus 100. By acting as distinct and separate foundations, the bottom boards 700a, 700b provide that the beehive support structure 600 beneath them may not operate as a part of the internal hive environment. The delineation provides for maintaining the integrity and isolation of each of the two hive's internal spaces.

Furthermore, the bottom boards 700a, 700b provide for retaining warmth within the hive during colder months. The retention of heat enhances the bees' survival through winter and promotes earlier brooding in the spring. The thermal management facilitated by the bottom boards 700a, 700b leads to more robust colony health and advancing the timing of brood production.

According to an embodiment, bottom board segments 700a, 700b is a half-circle or have a semicircular design with a tongue and groove joint features (not shown) on the straight edge, allowing two pieces to be placed atop either side of the groove 640 of the beehive support 600. When assembled, the bottom boards 800 appear to form a circular tray or bottom board tray with a central hole 810 as shown in FIG. 8. The hole 810 aligns with the beehive's 100 vertical axis, providing a passage for the rod 104 placed within the hollow pipe 620 of the beehive support 600. In an embodiment, the bottom board tray 700a/b comprises raised edges formed by the raised periphery 710 of the bottom board segments 700a and 700b. The raised edge provides a resting curvature which acts as a protective measure, to protect the bees from being crushed when components above are assembled or disassembled.

Once assembled, the bottom board segments 700a, 700b are configured to fit securely within either side of the groove system of the beehive support component 600. The bottom board segments 700a, 700b are stacked on top of the beehive support component 600. The groove 760 on the bottom board 700b may connect to the tongue 640 of the of the beehive support component 600. Additionally, the groove 730, 770 on the bottom board 700a, 700b may connect to the edges 630 of the beehive support component 600. The integration of bottom board segments 700a, 700b and the beehive support component 600 maintains the structural integrity and alignment of the beehive components. The tongue and groove joint design provides for straightforward assembly and reinforces the connection between the bottom board tray 800 and the beehive support component 600. The weight of the parts is distributed evenly to enhance the stability of the overall structure.

According to an embodiment, the bottom board segments 700a, 700b are constructed with High-Density Polyethylene (HDPE) material. Alternative materials may be used, which are preferably marine use-certified to provide durability, strength, and buoyancy. HDPE or another suitable material may be selected that combines the features of being lightweight for easier buoyancy. HDPE also allows the construction of thinner and stronger structural components than those typically achievable with wood. As less volume of materials is preferred for the beehive disclosed, the volume of HDPE required is less than that of wood needed for a comparable structure. Therefore, the overall assembly is lighter when constructed with HDPE as opposed to traditional wooden components, thereby enhancing the buoyancy and portability of the beehive system. The materials may be selected for their robustness and suitability for the marine environment, which may include exposure to water, UV radiation, and varying temperatures. The use of HDPE or similar materials for the bottom board segments 700a,700b also provides buoyancy of the beehive 100.

According to an embodiment, the bottom board segments 700a, 700b include at least one entrance 720. The entrance 720 provides for the ingress and egress of the Apidae family (bees) to and from the beehive system 100. The entrance 720 is positioned to maximize accessibility for the bees while minimizing exposure to potential threats.

The bottom board segments 700a, 700b are adaptable in design to accommodate different sizes or shapes of beehive entrances and meet unique requirements of various bee species or beekeeping practices. The modular features allow for easy customization and upgrades to the hive without the need for a complete overhaul.

Figure 9:
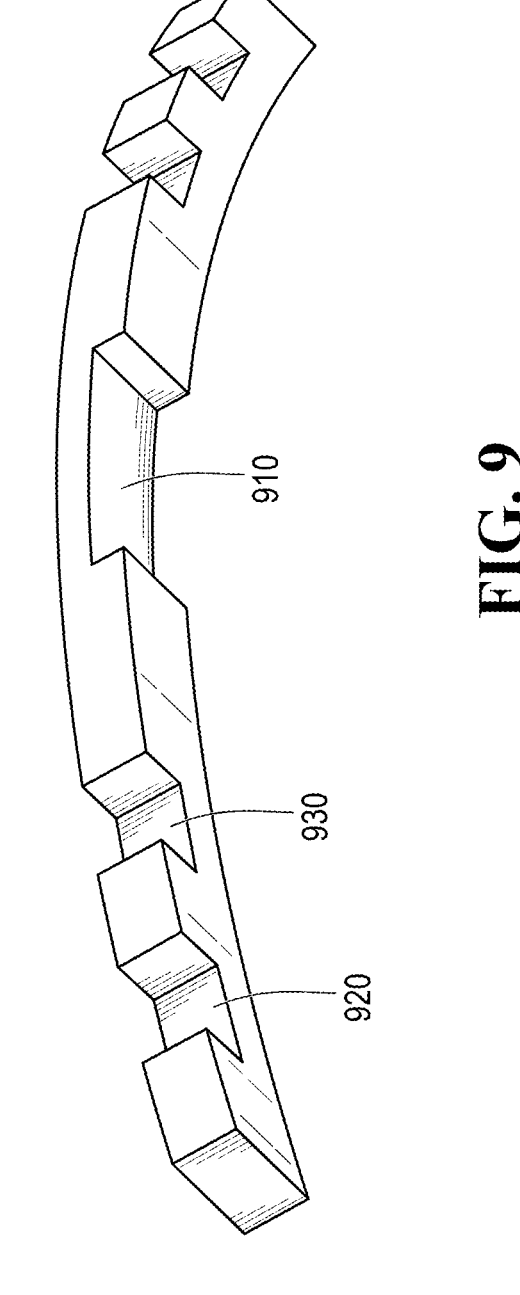
FIG. 9 shows a side perspective view of an entrance reducer of the beehive apparatus, according to an embodiment.

FIG. 9 shows a side perspective view of an entrance reducer 114 of the beehive apparatus, according to an embodiment.

The entrance reducer 114 is designed to regulate the access points of the beehive apparatus 100, and particularly into the bottom boards 700a/b.

According to an embodiment, the entrance reducer 114 is constructed from High-Density Polyethylene (HDPE) or an equivalent marine buoy-certified material. The entrance reducer 114 may share the same properties of durability, strength, and buoyancy as the other components of the beehive apparatus. The material choice is selected based on longevity and resistance to environmental factors, and to maintain the beehive's 100 overall buoyancy when deployed.

The entrance reducer 114 may be inserted in the opening 720 of the bottom boards 700a, 700b from the side, forming a seal that may be adjusted or removed depending on beekeeping requirements. The ability to insert and remove the entrance reducers 114 allows beekeepers to manage the flow of bees into and out of the hive 100. The entrance reducer 114 provides for controlling the internal environment of the hive 100 during different seasons and weather conditions.

According to an embodiment, the entrance reducer 114 is designed to complement the external curvature of the bottom boards 700a, 700b, providing a secure fit. The width of the entrance reducer 114 is fabricated to align with the entrance of the bottom boards 700a, 700b, presenting an entrance 910 that provides the passageway for bees while the reducers are in place. The feature provides for maintaining the hive's 100 defensive integrity against potential intruders or environmental elements, such as rain or debris, which may obstruct the hive's entrance.

According to an embodiment, grooves 920, 930 are incorporated into entrance reducer 114. The grooves 920, 930 facilitate easy installation and removal of the reducers 114. The grooves 920, 930 also provide a mechanism by which the reducers 114 may be securely affixed to the bottom boards 700a, 700b. The grooves 920, 930 are aligned so that the entrance reducer 114 may be removed from the outside at any time.

Variations in the design of the entrance reducer 114 may accommodate different hive entrance sizes or shapes, providing beekeepers with the flexibility to customize the entrance according to the specific needs of their bee colonies or local environmental conditions.

Figures 10A, 10B:
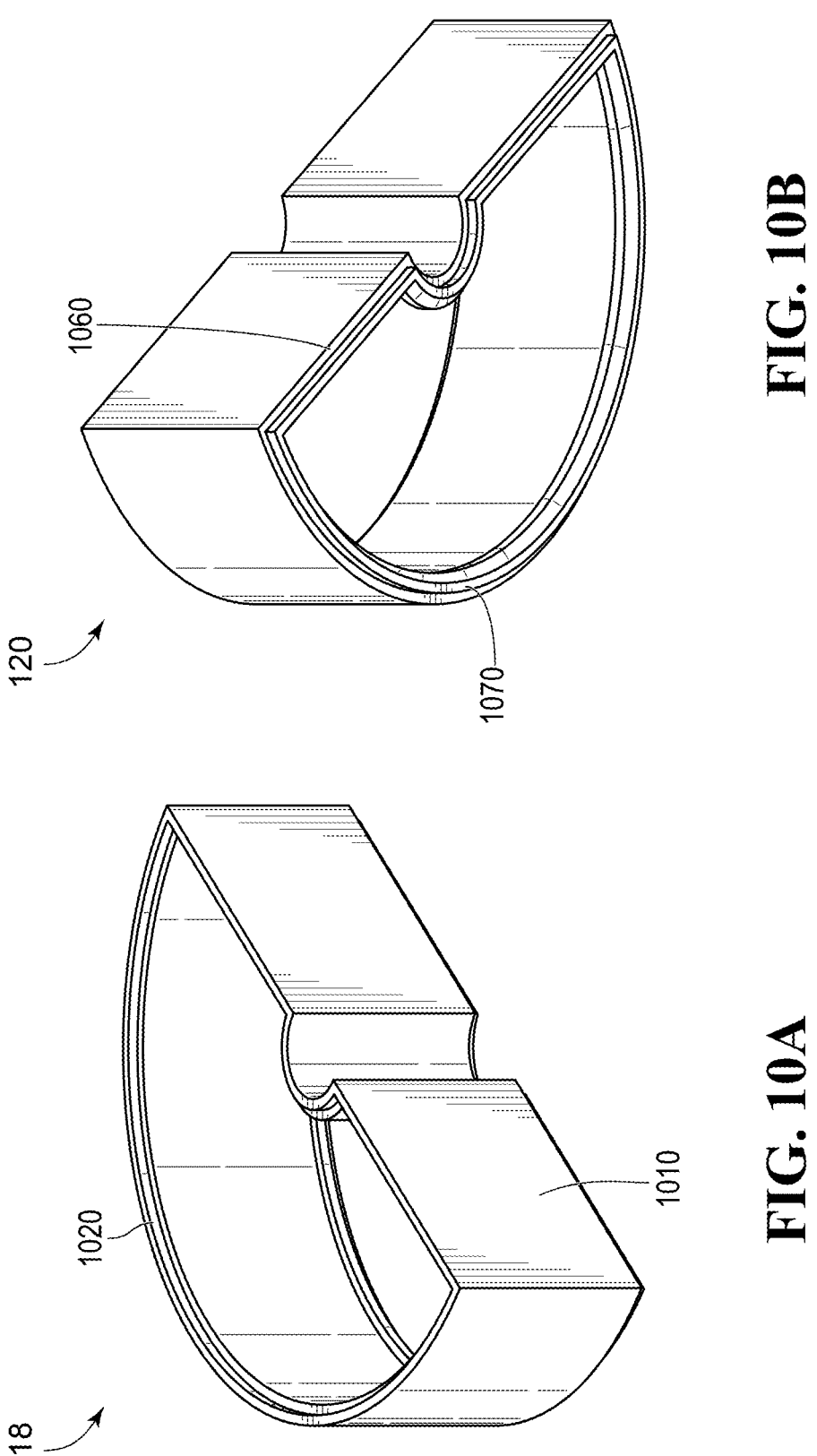
FIG. 10A shows a top side perspective view of a semicircular segment of the deep super of the beehive apparatus, according to an embodiment.
FIG. 10B shows a bottom side perspective view of a semicircular segment of the deep super of the beehive apparatus, according to an embodiment.

FIG. 10A shows a top side perspective view of a semicircular segment 118 of the deep super container of the beehive apparatus, according to an embodiment.

FIG. 10B shows a bottom side perspective view of a semicircular segment 120 of the deep super container of the beehive apparatus, according to an embodiment.

Figure 11:
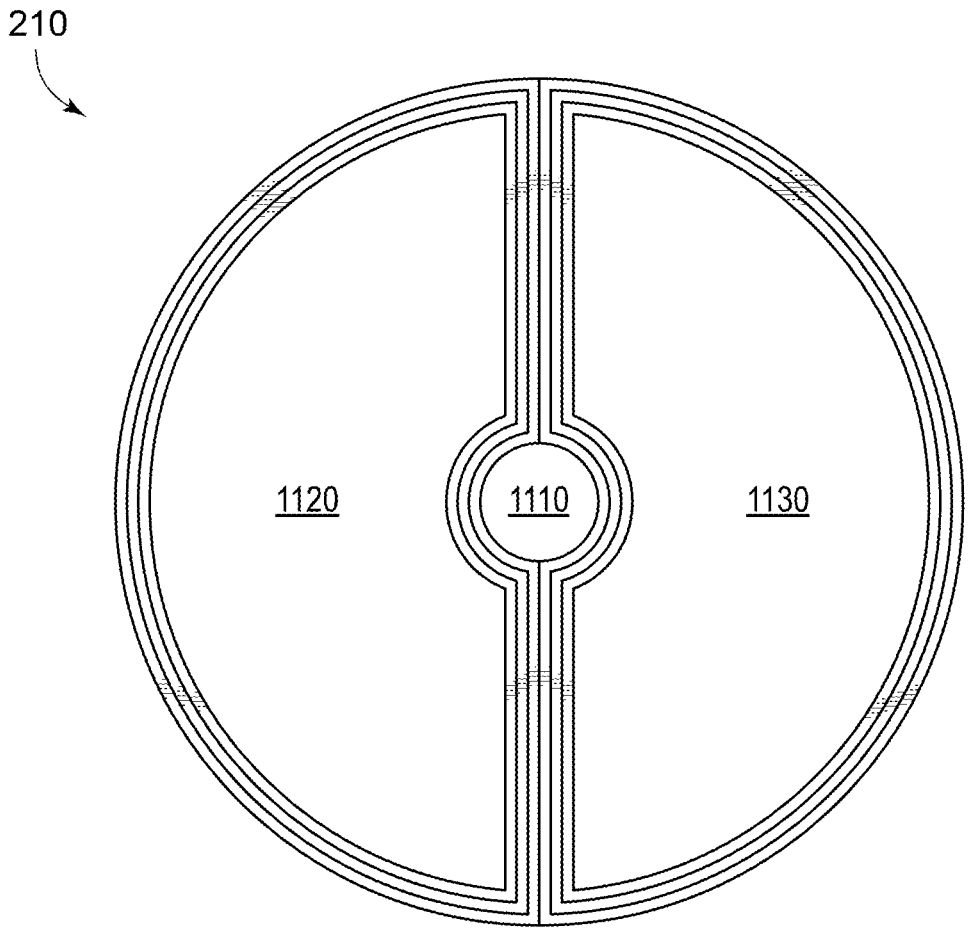
FIG. 11 shows a top assembled view of the deep super container of the beehive apparatus, according to an embodiment.

FIG. 11 shows a top unassembled view of the deep super container 210 of the beehive apparatus, according to an embodiment.

The deep super segments 118 and 120, shown as semicircular segments in FIGS. 10A and 10B, assemble together as illustrated in FIG. 11 to form a cylindrical container 210 with two compartments 1120, 1130, divided the internal ledge 1010, 1060. The arrangement provides that each compartment forms an independent section of the hive, directly aligned with and supported by respective bottom board. This setup facilitates the discrete management of each hive within the same apparatus, enhancing functionality and organization.

The deep super segments 118 and 120 may include a tongue and groove joint features (not shown) along the straight edge or internal ledge 1010, 1060 of the deep super segments' 118 and 120. The deep super segments 118 and 120 are inserted into the bottom boards 800. The deep super segments 118 and 120 may be attached to the bottom boards 800 using the tongue and grove joints 1020 and 1070 of the deep super segments 118 and 120.

The curvature and diameter of deep super segments 118 and 120 may correspond with the preceding components including the floating buoy 106, beehive support 600, and the bottom boards 800. The consistency across components provides for structural integrity and uniform appearance of the assembled hive 100.

Upon assembly, the deep super segments 118 and 120 create a cylindrical deep super container 210 of FIG. 11, with two compartments 1120, 1130. Each compartment 1120, 1130 of the deep super container 210 provides living quarters of the beehive 100, where the core activities of brood rearing and resource storage occur.

The internal ledge 1010, 1060, as shown in FIGS. 10A, 10B respectively, upon assembly extends from one edge of the cylinder 210 to the other. The internal ledge 1010, 1060 within the deep super container 210 also provides structural support for the weight of deep super frames (described below). The deep super frames may slot into the deep super container 210.

The cylindrical container 210 has a central hollow passage 1110 to allow the rod 104 and the pipe 620 of the beehive support 600 to pass through. The central hollow passage 1110 aligns with the central axis of the beehive 100, accommodating the rod 104 and maintaining the central alignment of all components.

According to an embodiment, the deep super segments 118 and 120 are constructed with High-Density Polyethylene (HDPE) or a suitable alternative that meets marine buoy certification standards.

The deep super segments 118, 120 of the beehive apparatus 100 operates as the designated area within the hive where brood production occurs, as it is the only section accessible to the queen bee. The exclusivity is enforced by the queen excluder net (described below), which effectively prevents the queen from entering the honey supers, thus restricting brood production to the deep super segments 118, 120 alone. Brood comprises the eggs and larvae of bees which are crucial items for the hive's continued health and longevity. The brood fills the hexagonal cells of the honeycombs in the deep super segments 118, 120, constituting a key activity within the hive. Generally, without a designated space for the queen to lay eggs and for larvae to develop, a hive would be unable to sustain its population beyond a single season, as no new bees would be produced to replace those lost to natural causes or harvesting activities. In an embodiment, deep super segments 118, 120 are configured to accommodate and support the reproductive process. In an embodiment, the deep super segments 118, 120 are larger, or taller, than honey super segments (described below), providing adequate space for the brood to be reared effectively. The design of deep super segments 118, 120 may include ledges or 'lips' on their sides, allowing them to rest securely within the bottom boards 700a, 700b, wherein the bottom boards 700a, 700b are equipped with internal ledges to support deep super segments 118, 120. The ledges or 'lips' not only facilitates easy insertion and removal of the frames but also ensures that they are held stably within the hive, safeguarding the delicate brood housed within.

The modular configuration of the deep super segments 118 and 120 provides flexibility in the assembly order, facilitating variance in the size and capacity of the beehive 100. Beekeepers may customize the hive based on the needs of their colony or environmental conditions. Once the deep super segments 118 and 120 are installed on the bottom boards 800, a queen excluder component 214 is placed on the top of the deep super segments 118 and 120.

Figures 12A, 12B:
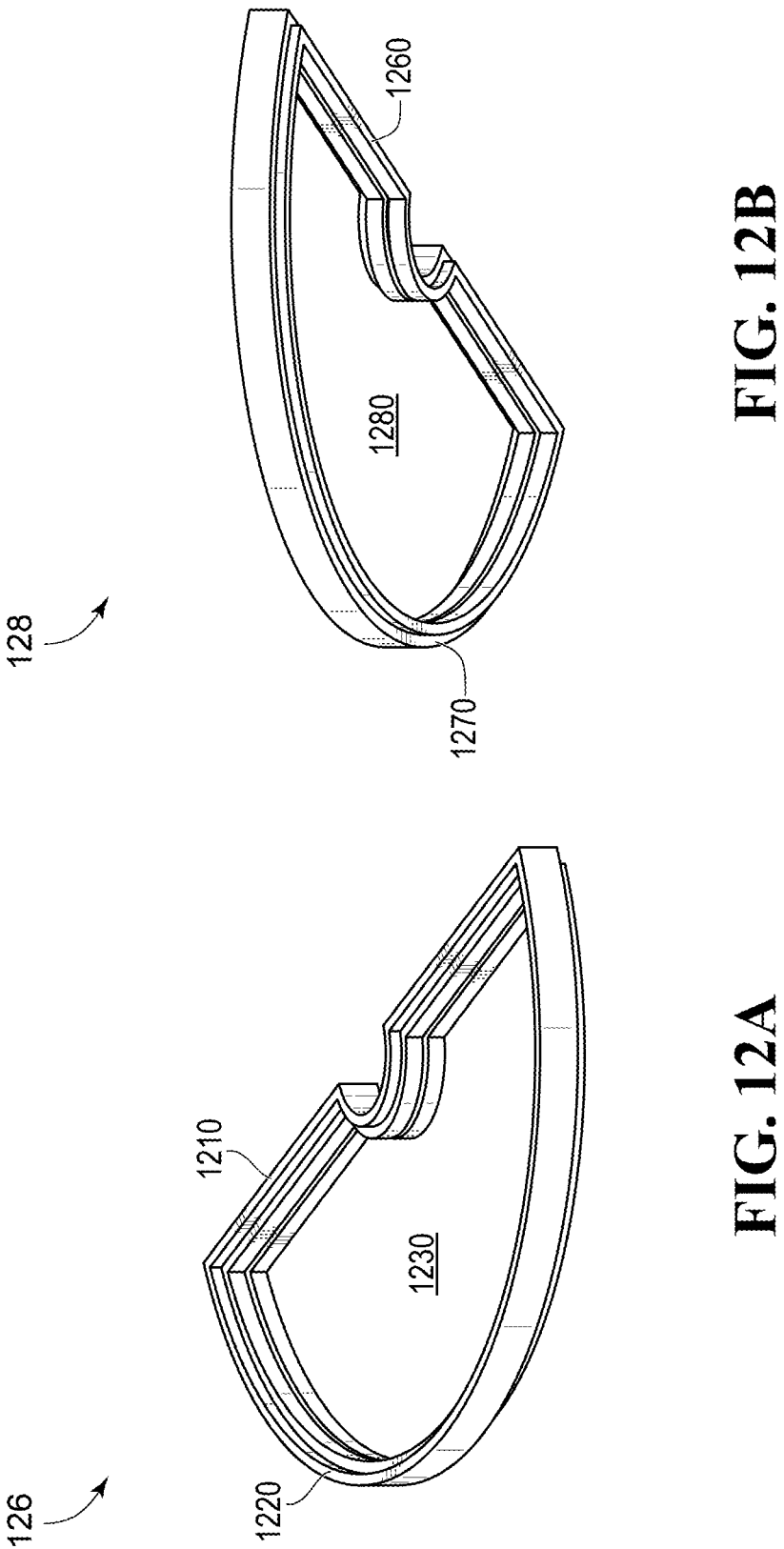
FIG. 12A shows a top side perspective view of a semicircular segment of the queen excluder frame of the beehive apparatus, according to an embodiment.
FIG. 12B shows a bottom side perspective view of a semicircular segment of the queen excluder frame of the beehive apparatus, according to an embodiment.

FIG. 12A shows a top side perspective view of a semicircular segment 126 of the queen excluder frame of the beehive apparatus, according to an embodiment.

FIG. 12B shows a bottom side perspective view of a semicircular segment 128 of the queen excluder frame of the beehive apparatus, according to an embodiment.

Figure 13:
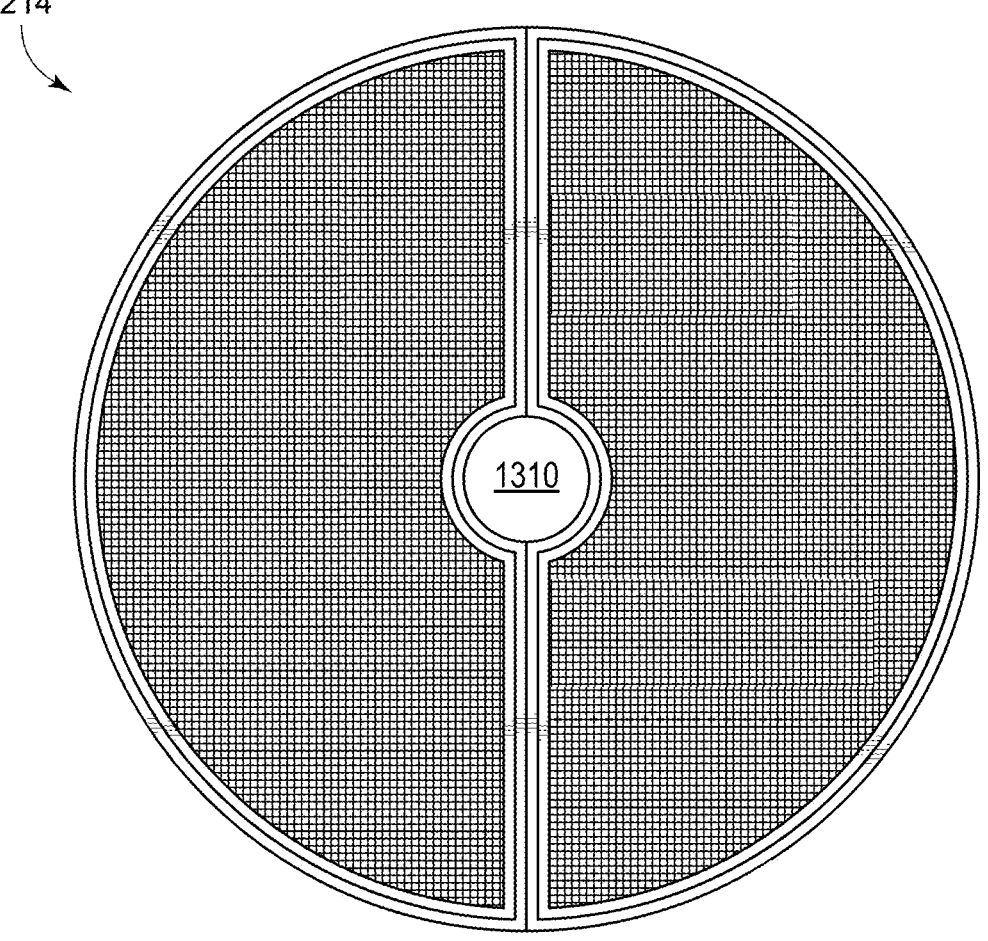
FIG. 13 shows a top assembled view of the queen excluder frame of the beehive apparatus, according to an embodiment.

FIG. 13 shows a top unassembled view of the queen excluder frame 214 of the beehive apparatus, according to an embodiment.

The queen excluder frame 214 is provided to segregate the brood from honey storage areas, such as the honey super container (described below) within the hive.

The queen excluder segments 126, 128 as shown in FIGS. 12A and 12B are designed as semicircular segments, to assemble to form a queen excluder frame 214 with an internal net as depicted in in FIG. 13. When assembled, the queen excluder frame 214 is inserted into the deep super container 210, connected using the tongue and grove edges.

The queen excluder 214 regulates the vertical movement of the queen bee within the hive. Specifically, the queen excluder 214 restricts her access upwards into the honey super segments (described below), ensuring that the brood production is confined to the designated deep super segments below. This restriction is achieved through the integration of a netting, known as the excluding net, which is embedded into the High-Density Polyethylene (HDPE) structure of the queen excluder frame at the internal regions 1230, 1280. The netting's design allows worker bees to pass through while effectively preventing the larger queen bee from accessing the upper sections of the hive where honey is stored. By inhibiting the queen from laying eggs in the honey super container (described below), the queen excluder frame 214 facilitates a cleaner honey harvest, as there is no brood or larvae in the honeycomb, which may otherwise complicate extraction and reduce the quality of the honey. This selectivity provides for the proper organization of the hive, ensuring that the queen remains in the deep super container 210 where brood rearing occurs.

According to an embodiment, the queen excluder segments 126, 128 assemble to form the queen excluder with a central hole 1310 as shown in FIG. 13. The hole aligns with the beehive apparatus' 100 vertical axis, providing a passage for the rod 104 and the hollow pipe 620 of the beehive support 600.

The queen excluder segments 126, 128 feature internal ledges 1210, 1260. The internal ledge 1210, 1260 facilitates structural organization of the hive's 100 upper sections. The internal ledge 1210, 1260 serves as a support for the honey supers (described above) that are placed above the queen excluder. The honey super segments 'click into' the internal ledge 1210, 1260, securing them in place following their installation. This arrangement physical stability of the honey supers and ensures that they are precisely aligned within the hive's architecture. The excluding net is embedded within the respective queen excluder segments 126, 128 and situated beneath the honey super segments.

According to an embodiment, the queen excluder segments 126, 128 are constructed from High-Density Polyethylene (HDPE) or an equivalent marine buoy-certified material. The queen excluder segments 126, 128 may share the same desirable properties of durability, strength, and buoyancy as the other components of the beehive apparatus. The material choice is selected based on longevity and resistance to environmental factors, and to maintain the beehive's 100 overall buoyancy when deployed.

The queen excluder segments 126, 128 are designed with a tongue and groove joint configuration along their edges 1220, 1270. The tongue and groove joint configuration enables a secure and precise assembly, creating a continuous circular frame that seamlessly integrates with the curvature of the preceding components of the hive structure 100. When assembled, the queen excluder frame 214 is positioned to rest within the groove system of the deep super container 210. The positioning coincides with the transition zone between the brood area (deep super container 210) and honey storage (honey super container). The queen excluder frame 214 is inserted directly above the deep super container 210 and below the honey super container (described below) for providing the transition.

The curvature of the queen excluder frame 214 may complement the preceding components to ensure that all components align correctly, preserving the structural integrity of the assembled hive 100. Additionally, the curvature of the queen excluder frame 214 may exhibit a grove and joint configuration to interface with other components of the beehive apparatus 100.

Modifications may be made to the queen excluder frame 214 to accommodate different bee species, hive sizes, or specific beekeeping methodologies.

Figure 14:
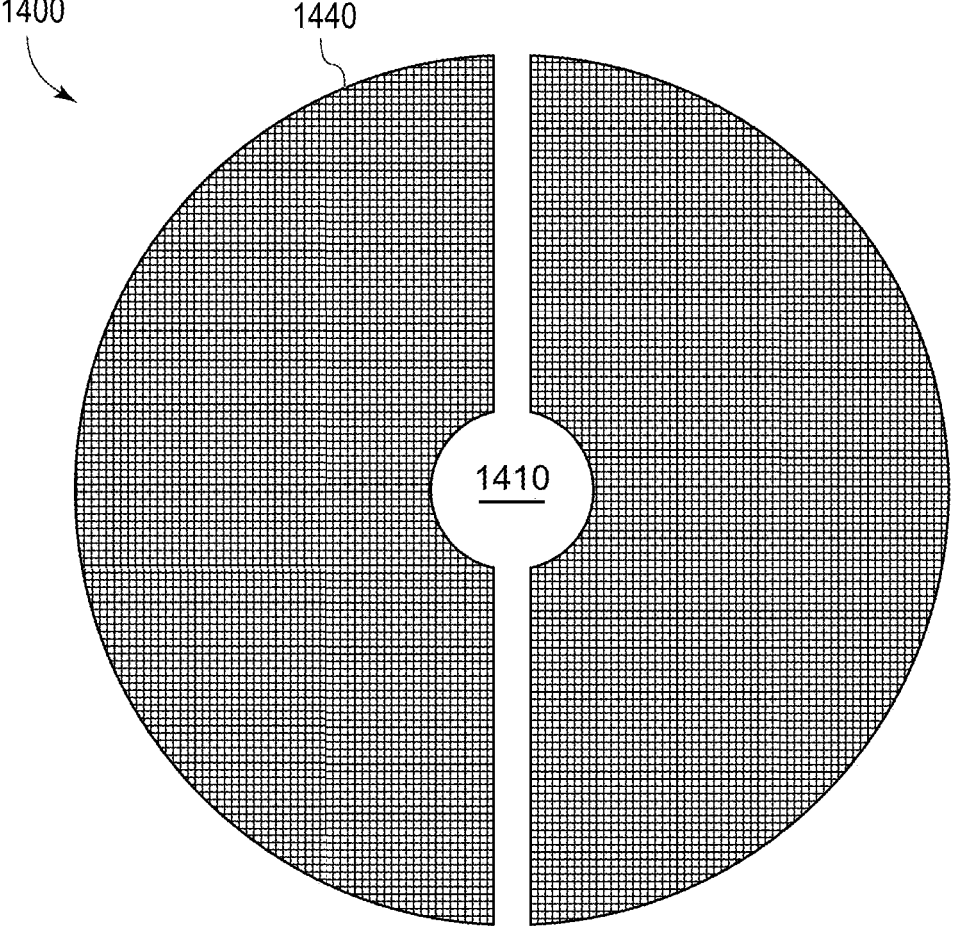
FIG. 14 shows a top assembled view of the excluding net of the beehive apparatus, according to an embodiment.

FIG. 14 shows a top view of the excluding net 1400 of the beehive apparatus, according to an embodiment.

The excluding net 1400 is placed with the queen excluder frame 214. The excluding net 1400 is provided to restrict the queen bee's access to honey super areas within the hive 100. When assembled, the excluding net 1400 is securely embedded within the queen excluder frame 214. The queen excluder frame 214 rests on the groove system of the deep super container 210.

The excluding net 1400 comprises two semicircular plates that come together to create a full circle with a central hole 1410. The central hole 1410 may align with the hive's 100 central axis, allowing for the unobstructed passage of the rod 400 and the pipe 620 of the beehive support 600, for providing stability to the beehive apparatus' 100 vertical column.

According to an embodiment, the excluding net 1400 may be constructed from perforated metal, plastic, or other suitable material. The excluding net 1400 features an array of openings or perforations 1440. The openings 1440 are standardized with a width ranging from 4.1 mm to 4.4 mm. Another dimension may be selected to allow worker bees to pass through freely while effectively preventing the larger queen bee from accessing the honey supers located above the deep super brood segments.

The placement and design of the excluding net 1400 may provide for the hive's productivity and honey purity. By restricting the queen bee from accessing the honey super container (described below), the excluding net 1400 may inhibit brood from being laid in the honey storage areas. The inhibitions of access may facilitate clean honey harvest and uncomplicated hive management.

Variations in the design of the excluding net 1400 may be implemented to cater to different bee species or beekeeping practices. For instance, the size of the perforations 1440 may be adjusted according to the particular size of the queen bee in a given bee colony, which may vary among different breeds of bees or due to specific beekeeper requirements.

Figures 15A, 15B:
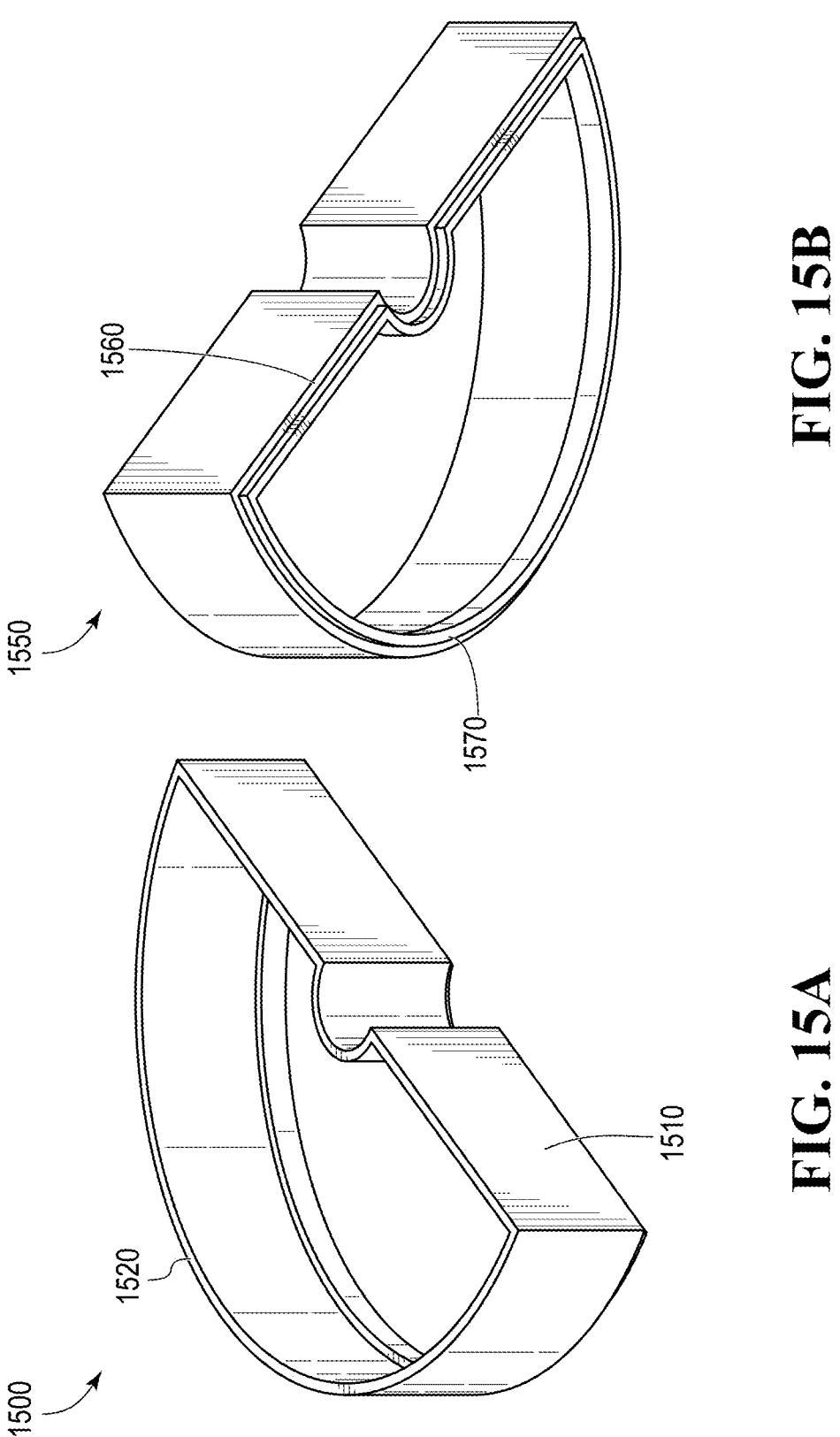
FIG. 15A shows a top side perspective view of a semicircular segment of the honey super of the beehive apparatus, according to an embodiment.
FIG. 15B shows a bottom side perspective view of a semicircular segment of the honey super of the beehive apparatus, according to an embodiment.

FIG. 15A shows a top side perspective view of a semicircular segment 1500 of the deep super of the beehive apparatus, according to an embodiment.

FIG. 15B shows a bottom side perspective view of a semicircular segment 1550 of the deep super of the beehive apparatus, according to an embodiment.

Figure 16:
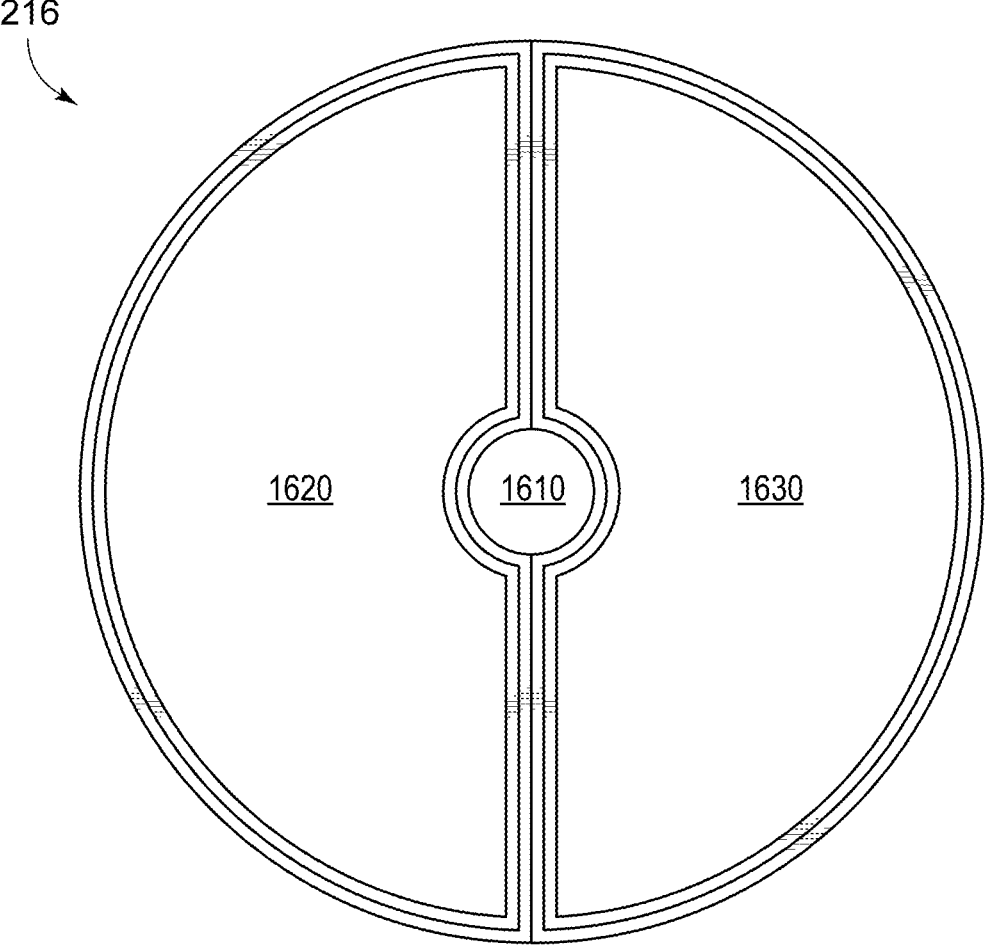
FIG. 16 shows a top assembled view of the honey super container of the beehive apparatus, according to an embodiment.

FIG. 16 shows a top unassembled view of the deep super 216 of the beehive apparatus, according to an embodiment.

The honey super segments 1500 and 1550, shown as semicircular segments in FIGS. 15A and 15B, assemble together as illustrated in FIG. 16 to form a complete cylindrical container 216, with two compartments 1620, 1630, dividing the internal ledge 1510, 1560. The arrangement provides that each compartment forms an independent honey collection section of the hive. This setup facilitates the discrete management of each compartment within the same beehive apparatus 100.

The honey super segments 1500 and 1550 may include tongue and groove joints (not shown) along the straight edge or internal ledge 1510, 1560 of the honey super segments' 1500 and 1550, for a seamless connection between the honey super segments 1500 and 1550 to form a solid structure. The honey super segments 1500 and 1550 are attached on top of the queen excluder frame 1400. The honey super segments 1500 and 1550 may be attached to the queen excluder frame 1400 using the tongue and grove joints 1520 and 1570 of the deep super segments 118 and 120.

The curvature and diameter of honey super segments 1500 and 1550 may correspond with the preceding components including the floating buoy 500, beehive support 600, bottom boards 800, deep super container 210, and the queen excluder frame 1400. The consistency across components is provide for structural integrity and uniform appearance of the assembled hive.

Upon assembly, the honey super segments or compartments 1500 and 1550 create a cylindrical honey super container 216 of FIG. 16, with two compartments 1620, 1630. The honey super compartments 1500 and 1550 within the beehive apparatus 100 conducts the production and storage of honey, which is subsequently harvested by beekeepers. The honey super compartments 1500 and 1550 are designed to be accessible exclusively to worker bees, ensuring that no eggs are laid within honey super compartments 1500 and 1550 by the queen bee. This exclusion of honey bees is crucial as it prevents the 'conversion' processes that would typically turn honey into brood, thereby maintaining the purity and quality of the honey during the harvesting season. Unlike the deep super segments 118 and 120, which are the designated area for brood rearing and colony reproduction, the honey super compartments 1500 and 1550 are resource storage centers. The honey super compartments 1500 and 1550 provide a space where worker bees can deposit and manage honey, free from the activities associated with brood development. This separation ensures that the honey collected from these supers is free of contaminants associated with brood rearing, making it ideal for extraction and consumption.

The internal ledge 1510, 1560, as shown in FIGS. 15A, 15B respectively, upon assembly extends from one edge of the cylinder 216 to the other. The internal ledge 1510, 1560 within the honey super container 216 also provides structural support for the weight of honey super frames 1500, 1550.

The honey super frames or segments 1500, 1550 are designed for worker bees to deposit honey, away from the brood areas (such as the deep super frames 118, 120), ensuring that the honey remains uncontaminated by eggs or larvae. The positioning of the honey super container 216 above the queen excluder frame 1440 provides that the queen bee (located at deep super container 210) and drones are inhibited from the honey super container 216, preserving the purity of the honey produced.

The honey super container 216 forms a central hollow passage 1610. The central hollow passage 1610 is designed to interface with the pipe 620 of the beehive support 600. The pipe 620 houses the resilient rod 400.

According to an embodiment, the honey super segments 1500 and 1550 are constructed with High-Density Polyethylene (HDPE) or a suitable alternative that meets marine buoy certification standards.

The modular configuration of the honey super segments 1500 and 1550 provides flexibility in the assembly order, facilitating variance in the size and capacity of the beehive 100. Beekeepers may customize the hive 100 based on the needs of their colony or environmental conditions.

Figures 17A, 17B:
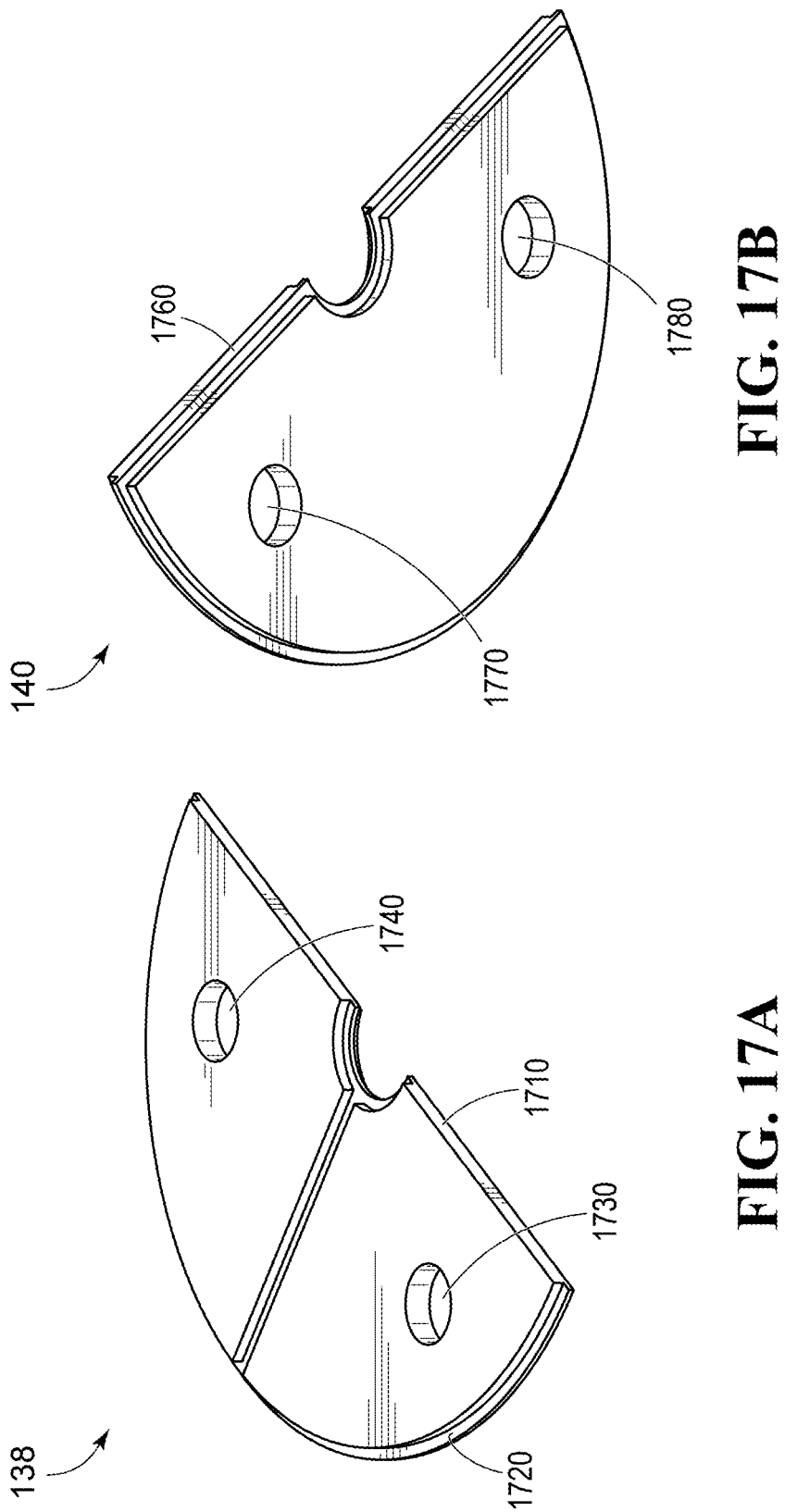
FIG. 17A shows a top side perspective view of a semicircular segment of the inner covers of the beehive apparatus, according to an embodiment.
FIG. 17B shows a bottom side perspective view of a semicircular segment of the inner covers of the beehive apparatus, according to an embodiment.

FIG. 17A shows a top side perspective view of a semicircular segment 138 of the inner covers of the beehive apparatus, according to an embodiment.

FIG. 17B shows a bottom side perspective view of a semicircular segment 140 of the inner covers of the beehive apparatus, according to an embodiment.

Figure 18:
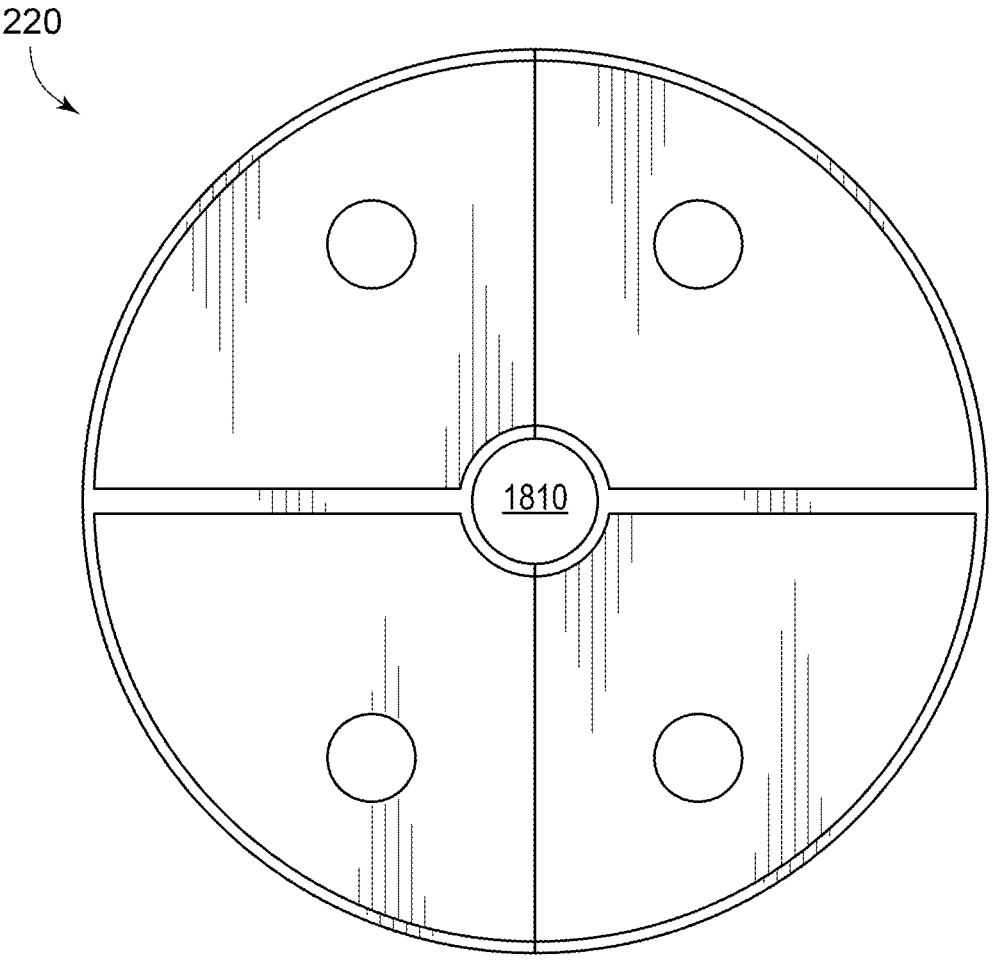
FIG. 18 shows a top assembled view of the inner covers of the beehive apparatus, according to an embodiment.

FIG. 18 shows a top unassembled view of the inner cover 220 of the beehive apparatus, according to an embodiment.

According to an embodiment, inner cover segments 138, 140 are a half-circle or have a semicircular design with a tongue and groove joint features (not shown) on the straight edge 1710, 1760, allowing two pieces 138, 140 to join seamlessly. When assembled, inner cover segments 138, 140 form a complete inner cover 220 with a central hole 1810 as shown in FIG. 18. The hole 1810 aligns with the beehive's 100 vertical axis, providing a passage for the rod 400 and the hollow pipe 620 of the beehive support 600.

The inner cover 220 is placed atop the honey super container 216, providing a snug fit that seals the hive 100. According to an embodiment, the inner cover 220 comprises a tongue and groove joint at the curvature 1720 for a secure assembly over the honey super container 216. The sealing provides for restricting precipitation, predators, and unwanted debris from entering the hive 100, while also maintaining the hive's 100 internal climate by restricting excessive heat loss or moisture accumulation.

According to an embodiment, inner cover segments 138, 140 include cylindrical holes 1730, 1740, 1770, and 1780. The cylindrical holes 1730, 1740, 1770, and 1780 allow for ease of removal of the inner cover 220 to enable the beekeeper to easily lift the cover 220 without disrupting the hive 100. The cylindrical holes 1730, 1740, 1770, and 1780 also provide for anchoring the outer covers (described below) onto the top of the inner covers.

The design of the inner cover segments 138, 140 also contributes to the overall ventilation of the hive 100. The cylindrical holes 1730, 1740, 1770, and 1780 may be utilized to manage airflow and the restriction of condensation within the hive 100 that could lead to mold growth or other issues.

According to an embodiment, the inner cover segments 138, 140 are constructed with High-Density Polyethylene (HDPE) material. Alternative materials may be used, which are preferably marine use-certified to provide durability, strength, and buoyancy. The materials may be selected for their robustness and suitability for the marine environment, which may include exposure to water, UV radiation, and varying temperatures. The inner cover 220 may be modified to include additional features such as insulation for colder climates, or ventilation enhancements for hotter regions.

Figures 19A, 19B:
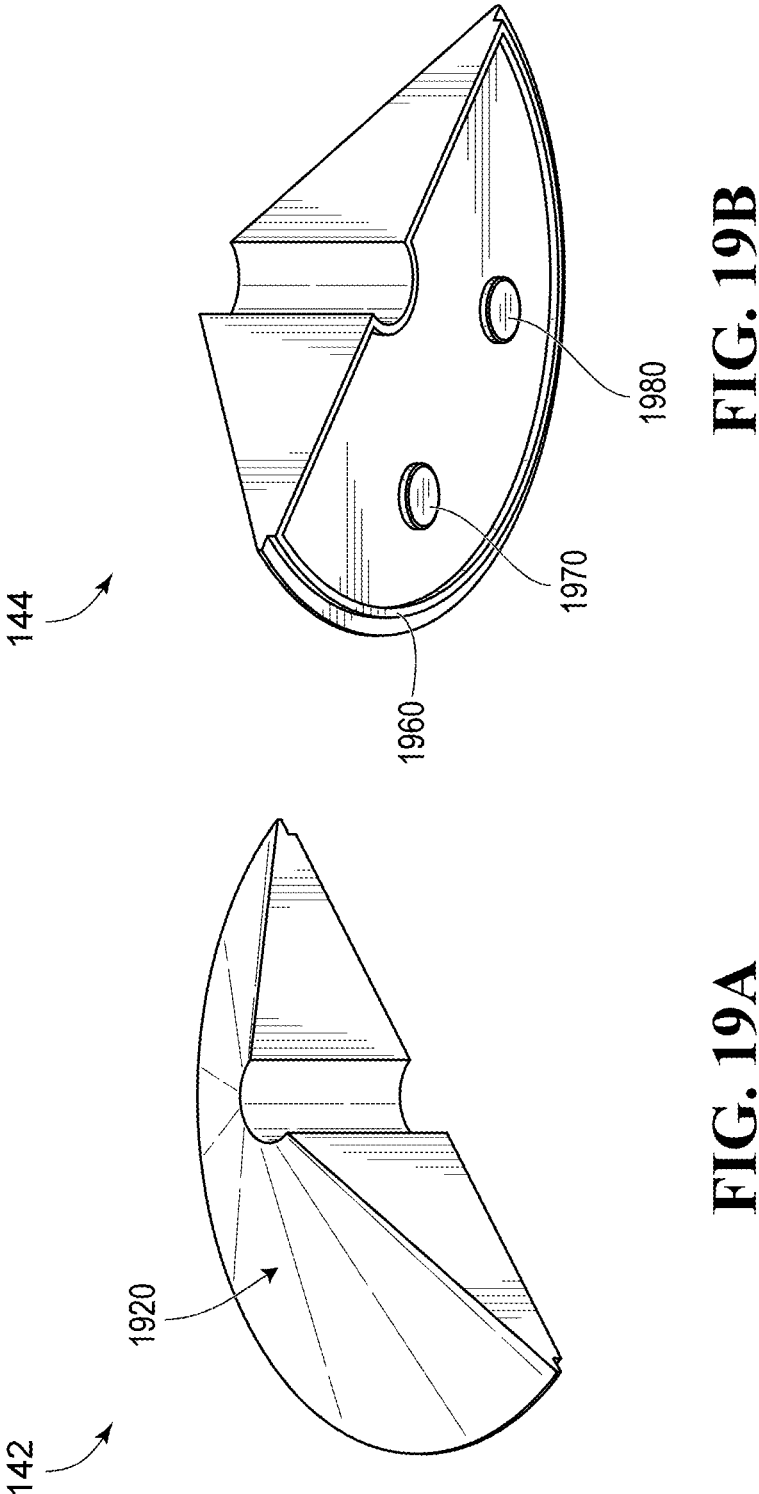
FIG. 19A shows a top side perspective view of a semicircular segment of the outer covers of the beehive apparatus, according to an embodiment.
FIG. 19B shows a bottom side perspective view of a semicircular segment of the outer covers of the beehive apparatus, according to an embodiment.

FIG. 19A shows a top side perspective view of a semicircular segment of the outer covers of the beehive apparatus, according to an embodiment.

FIG. 19B shows a bottom side perspective view of a semicircular segment of the outer covers of the beehive apparatus, according to an embodiment.

FIG. 20 shows a bottom unassembled view of the outer covers of the beehive apparatus, according to an embodiment.

According to an embodiment, outer cover segments 142, 144 have a semi-conical design with a tongue and groove joint features (not shown) on the curvature 1960, allowing two pieces 142, 144 to fit on top of the assembled inner cover 220. When assembled, outer cover segments 142, 144 form a conical outer cover 222. The outer cover 222 includes a central passage 2010 as shown in FIG. 20. The passage 2010 aligns with the beehive's 100 vertical axis, providing a passage for the rod 400 and the hollow pipe 620 of the beehive support 600.

According to an embodiment, the outer cover segments 142, 144 are constructed with High-Density Polyethylene (HDPE) material. Alternative materials may be used, which are preferably marine use-certified to provide durability, strength, and buoyancy. The conical outer cover 222 may feature an internal hollow space with necessary support structures. The supports provide for maintaining the shape and stability of the outer cover 222 under the weight of accumulated precipitation or debris. The hollow design contributes to the overall buoyancy of the beehive apparatus 100 when floating in water.

The outer cover segments 142, 1960 are designed with a curved external roof 1920 that facilitates the shedding of water and debris. The slope of the roof 1920 is congruent with the top contour of the beehive support 600, providing that materials that fall onto the hive may naturally slide off, rather than accumulating on the surface.

In an embodiment, the overhanging edges (not shown) of the outer cover 222 extend beyond the hive's 100 profile. The overhanging edges may direct rainwater and debris away from the hive entrance 720. The overhanging edges may also inhibit potential blockages to that the entrance 720 to the beehive 100, for example the entrance 720, remains clear, allowing for the unimpeded passage of bees.

The outer cover segments 142, 144 may include cylindrical inserts 1970, 1980 located on the underside. The cylindrical inserts 1970, 1980 are configured to fit perpendicularly into the cylindrical holes 1730, 1740 of the inner cover 140, thereby locking the outer cover 222 in place and restricting any lateral movement that could compromise the hive's seal.

Variations in the design of the outer cover 222 may include alterations to the slope for different climates or the addition of UV protective coatings for regions with higher sun exposure.

According to an embodiment, the beehive apparatus accommodates specialized hive frames as internal components, specifically designed for housing bee combs.

To provide beekeepers with the means to customize the handling and manipulation of the beehive components, various handle (not shown) installation tools may be used. The beehive components may include floating buoy component 500, beehive support structure 600, bottom board 800, entrance reducer 114, deep super container 210, queen excluder frame 214, honey super container 216, inner covers 220, and outer covers 222.

According to an embodiment, handles may be installed using suction to provide a flexible and non-permanent attachment to the beehive components, allowing beekeepers to reposition or remove the handles as needed without compromising the structural integrity of the beehive components.

According to an embodiment, handles may be installed using gluing or chemical bonding. The installation method includes the adhesion of handles to the exterior of beehive components through gluing or chemical bonding techniques. The boding processes may include the melting or fusing of handle materials to the beehive surface, ensuring a secure and durable attachment.

According to an embodiment, handles may be installed using Structural securement. The method includes utilizing nuts and bolts or tensioned rods, to provide a permanent fixture of handles to various components of the beehive 100.

Solar or Air Powered Electricity Generation: The beehive apparatus may be configured to provide energy integration.

According to an embodiment, power generation may be installed at the rod 400 and the outer cover 222. The rod 400 may be modified to feature a hollow or internally wired structure for auxiliary power generation devices. A solar panel or a low-weight wind turbine may be installed at the apex of the rod 400 or at the outer cover 222. The power generation configuration is intended to harvest electrical power from solar or wind energy, respectively, thus providing an eco-friendly power solution for various beehive operations or monitoring devices.

In another embodiment, wind turbine technology may be employed for power generation by attaching turbine wings to strategic positions such as the top of the rod 400, outer covers 222, or along the pipe 620. The turbine wings are configured to capture wind energy by rotating with the airflow. The rotational movement is converted into electrical power through a wiring system that runs adjacent to or within the rod 400.

In another embodiment, water current turbines including a set of turbine wings are attached to the rod 400. The turbine wings are specifically designed to interface with and rotate according to the water flow around the hive 100. As the rod 400 is exposed to water currents, the turbine wings harness kinetic energy from the water movement, converting it into electrical power.

In another embodiment, either one or more of the rod 400, outer covers 222, or the pipe 620 are configured to operate as meteorological data acquisition platforms. The rod 400, outer covers 222, or the pipe 620 may be equipped with sensors and instrumentation capable of collecting a variety of environmental data such as temperature, humidity, wind speed, elevation, and rainfall. By integrating these sensors into the structural elements of the beehive, such as the top of the rod or along the surfaces of the outer covers and pipe, the hive 100 may continuously monitor local weather conditions.

FIG. 21 is a flow chart of a method 2100 of assembly for the beehive apparatus 100, according to an embodiment.

At 2102, the method includes installing a foundation for the beehive apparatus. The foundation is positioned at a subsurface level or upon the surface, depending on environmental considerations such as water table levels. The foundation possesses a central through-hole designed to accommodate the subsequent insertion of a metal rod.

At 2104, the method includes fixing a metal rod into a central hole of the foundation. The rod serves multiple purposes, including providing a vertical guide for the beehive structure and maintaining the overall stability of the apparatus against lateral forces.

At 2106, the method includes positioning a floating buoy onto the metal rod, above the foundation. The buoy is designed to envelop the rod, allowing for vertical movement while minimizing direct contact to reduce friction and wear.

At 2108, the method includes securing a beehive support to the top section of a floating buoy. The beehive support is designed with a groove system that interfaces with the floating buoy, ensuring that all components above are correctly aligned and stabilized.

At 2110, the method includes assembling the bottom boards upon the beehive support. The bottom boards feature a central hole that accommodates the metal rod and hollow pipe of the beehive support, maintaining vertical alignment within the hive structure.

At 2112, the method includes placing deep super containers atop the bottom boards. The deep super containers include internal ledges that provide support for the frames where bees can rear brood and store honey.

At 2114, the method includes inserting the queen excluder frame above the deep super containers. The queen excluder frame may include an excluding net. The queen excluder frame restricts the queen bee from entering the honey storage area in the honey super containers placed above.

At 2116, the method includes placing honey super containers on top of the queen excluder frame. The honey super containers are designed to store honey produced by the worker bees, ensuring that honey super containers remain uncontaminated by brood.

The method may include placing the inner covers on top of the honey super containers. The inner covers provide a seal against environmental elements and feature openings to facilitate their removal and to secure the outer covers.

The method may include placing the outer covers onto the inner covers. The outer covers include cylindrical inserts that fit into the inner covers, creating a weatherproof seal and completing the assembly of the beehive apparatus.

This buoyant modular beehive apparatus and method is intended to withstand flooding in regions with variable water levels, flash floods, and unpredictable climatic conditions that often wipe out entire bee colonies due to hives being damaged and drowned. As the beehive components are configured to rise and float in adaptation to varying water levels, the apparatus may prevent mass colony losses due to flooding, or even allow for beekeeping on floodplains and regions influenced by tidal water patterns such as coastlines. This capability is intended to spur ecological health and strengthen pollinator resilience. The beehive apparatus may be built from high-density polyethylene (HDPE) and steel. The beehive apparatus may also be built from recyclable materials to further decrease negative impacts on the natural environment. The HDPE buoyant hive components may be manufactured via injection molding. The resilient rod configured to operate as an anchor point may also be modified for green energy production via solar and wind are also viable.

While the above description provides examples of one or more apparatus, methods, or systems, it will be appreciated that other apparatus, methods, or systems may be within the scope of the claims as interpreted by one of skill in the art.

The invention claimed is:

1. A beehive apparatus comprising:
   a securing mechanism for anchoring the beehive apparatus to a ground surface, the securing mechanism comprising a rod extending vertically and a foundation secured within the ground, wherein the foundation has a central opening configured to receive the rod;

a beehive comprising:
      a buoyancy component configured for floating and rising with a water level;
      a plurality of honey harvesting components positioned atop the buoyancy component, wherein the honey harvesting components house bees and store honey above the water level; and
      wherein the buoyancy component and the plurality of honey harvesting components include a central passage configured to receive the rod, wherein the beehive moves up the rod as the water level increases and down the rod as the water level decreases.

2. The beehive apparatus of claim 1, wherein the rod operates as a solar power generation unit.

3. The beehive apparatus of claim 2, wherein the rod includes solar panels.

4. The beehive apparatus of claim 2, wherein the rod includes an internally wired opening to provide electrical connectivity to the solar panels.

5. The beehive apparatus of claim 2 wherein the plurality of honey harvesting components include brooding containers for brooding.

6. The beehive apparatus of claim 5 wherein the brooding containers include internal ledges configured to, in use, support deep super frames.

7. The beehive apparatus of claim 5 wherein the plurality of honey harvesting components further include honey super containers configured for honey storage wherein the honey super containers include internal ledges configured to, in use, support honey super frames, and wherein the honey super containers are located above the brooding containers.

8. The beehive apparatus of claim 7, further including an entrance for allowing bees to enter a brooding area within the brooding containers.

9. The beehive apparatus of claim 8 further comprising a queen excluder frame positioned between the brooding containers and the honey super containers.

10. The beehive apparatus of claim 9, wherein the queen excluder frame includes an excluding net for restricting the travel of a queen bee and drones to a honey storage area in the honey super containers.

11. The beehive apparatus of claim 10, wherein the queen excluder frame includes a central opening aligned with the central passage of the brooding containers and honey super containers to provide axial alignment of the honey harvesting components.

12. The beehive apparatus of claim 11 further comprising inner cover components, wherein the inner cover components are positioned above the honey super containers.

13. The beehive apparatus of claim 12 further comprising outer cover components, wherein the outer cover components are positioned above the inner cover components, and wherein the outer cover components seal the beehive apparatus from external elements.

14. The beehive apparatus of claim 13, wherein the outer cover components include an overhang directing precipitation and debris away from the entrance of the bee and honey storage components.

\* \* \* \* \*